US011095339B2

(12) United States Patent
Ohno

(10) Patent No.: US 11,095,339 B2
(45) Date of Patent: Aug. 17, 2021

(54) RESONANCE APPARATUS, POWER TRANSMISSION APPARATUS, AND POWER TRANSMISSION METHOD TO IMPROVE NONCONTACT POWER TRANSMISSION

(71) Applicant: Laser Systems Inc., Anan (JP)

(72) Inventor: Yasuo Ohno, Kanagawa (JP)

(73) Assignee: LASER SYSTEMS INC., Anan (JP)

( * ) Notice: Subject to any disclaimer, the term of this patent is extended or adjusted under 35 U.S.C. 154(b) by 0 days.

(21) Appl. No.: 16/988,952

(22) Filed: Aug. 10, 2020

(65) Prior Publication Data
US 2021/0044331 A1 Feb. 11, 2021

(30) Foreign Application Priority Data
Aug. 8, 2019 (JP) .............................. JP2019-146677

(51) Int. Cl.
*H04B 5/00* (2006.01)
*H02J 50/20* (2016.01)
*H02J 50/12* (2016.01)

(52) U.S. Cl.
CPC ............ *H04B 5/0037* (2013.01); *H02J 50/12* (2016.02); *H02J 50/20* (2016.02); *H04B 5/0093* (2013.01)

(58) Field of Classification Search
CPC .................................. H02J 50/00; H04B 5/00
USPC ........................................................ 307/104
See application file for complete search history.

(56) References Cited

U.S. PATENT DOCUMENTS

| 2013/0187477 | A1* | 7/2013 | Nagai | ........................ | H01P 7/08 |
| | | | | | 307/104 |
| 2014/0117926 | A1* | 5/2014 | Hwu | ........................ | H02J 50/40 |
| | | | | | 320/108 |
| 2014/0333151 | A1* | 11/2014 | Matsui | ..................... | H01F 38/14 |
| | | | | | 307/104 |
| 2015/0204928 | A1* | 7/2015 | Hoover | .................... | H02J 50/40 |
| | | | | | 320/108 |

(Continued)

FOREIGN PATENT DOCUMENTS

JP 4835334 B2 12/2011

OTHER PUBLICATIONS

Ohira T., "Angular Expression of Maximum Power Transfer Efficiency in Reciprocal Two-Port Systems" WPTC 2014,978-1-4799-3923-8/14; pp. 228-230.

(Continued)

*Primary Examiner* — Adi Amrany
(74) *Attorney, Agent, or Firm* — Cantor Colburn LLP

(57) ABSTRACT

Other resonators similar in shape to itself, with a partially open structure of a closed curve line, arranged opposite itself. A closed-curve line is formed between the resonator, which uses electromagnetic coupling to transfer high-frequency power in a non-contact manner, and the drive unit causes the resonator to rotate in the circumferential direction of the resonator in the plane of the Transfer of high-frequency power between a resonator and another resonator at multiple locations where the angles in the circumferential direction are different from each other and transmitted from one resonator to the other that is detected at each position of the resonator. Control to set the angle at which this transfer of high-frequency power is carried out based on the power value of the high-frequency power that was set. A resonance device comprising a part.

6 Claims, 15 Drawing Sheets

(56) References Cited

U.S. PATENT DOCUMENTS

2015/0214752 A1* 7/2015 Gluzman ............... H02J 50/40
307/104
2019/0371515 A1* 12/2019 Ha ......................... H02J 50/40

OTHER PUBLICATIONS

Takashi Ohira, "Voltage-Current Domain View to Maximum Efficiency and k-Q Product", 2014 Microwave workshops & Exhibition (MWE 2014) Digest WS05-03.
I. Awai and A.K.Saha, "Open Ring Resonators Applicable to Wide-band BPF", Proceedings of Asia-Pacific Microwave Conference 2006, ISBN:978-4-902339-08-6.

* cited by examiner

RESONANCE APPARATUS, POWER TRANSMISSION APPARATUS, AND POWER TRANSMISSION METHOD TO IMPROVE NONCONTACT POWER TRANSMISSION

CROSS REFERENCE TO RELATED APPLICATIONS

The present invention claims priority under 35 U.S.C. § 119 to Japanese Application No. 2019-146677 filed Aug. 8, 2019, the entire content of which is incorporated herein by reference.

TECHNICAL FIELD

The present disclosure relates to a resonance apparatus, a power transmission apparatus, and a power transmission method.

BACKGROUND ART

There has been known a power transmission apparatus that transmits and receives high-frequency power or a high-frequency signal (hereinafter collectively referred to as "high-frequency power") in a noncontact manner by using two open ring resonators (see, for example, PTL 1 and NPL 1).

This type of power transmission apparatus includes a transmission-side open ring resonator and a reception-side open ring resonator that are disposed facing each other. The power transmission apparatus causes the transmission-side open ring resonator and the reception-side open ring resonator to electromagnetically couple (for example, magnetically resonate) with each other to transmit high-frequency power from the transmission-side open ring resonator to the reception-side open ring resonator.

In general, open ring resonators are configured such that the transmission-side open ring resonator and the reception-side open ring resonator resonate at the same frequency, and are typically configured such that the line length of the ring is about $\mu/2$ calculated from the resonant frequency.

The power transmission apparatus having such a configuration is capable of obtaining a high transmission efficiency in a noncontact manner and is thus expected to be applied to noncontact power transmission for mobile apparatuses, electric vehicles, and the like.

CITATION LIST

Patent Literature

PTL 1
Japanese Patent No. 4835334

Non Patent Literature

NPL 1
I. Awai and A. K. Saha, "Open Ring Resonators Applicable to Wide-band BPF", Proceedings of Asia-Pacific Microwave Conference 2006, ISBN: 978-4-902339-08-6

NPL 2
Takashi Ohira, "Voltage-Current Domain View to Maximum Efficiency and k-Q Product", 2014 Microwave workshops & Exhibition (MWE 2014) Digest WS05-03

This type of power transmission apparatus is advantageous in being compact and highly efficient but has an issue that the state of electromagnetic coupling between the two open ring resonators changes in accordance with the positional relationship between the open ring resonators and the power transmission efficiency decreases. This issue is likely to arise particularly when one of the two open ring resonators is mounted in a moving body, for example, when power is transmitted from a resonator fixed onto the ground to a resonator mounted in a moving body.

SUMMARY OF INVENTION

The present disclosure has been made in view of the above-described issue and an object of the present disclosure is to provide a resonance apparatus, a power transmission apparatus, and a power transmission method that are capable of addressing a displacement between two resonators.

The present disclosure mainly solving the issue mentioned above provides a resonance apparatus, comprising: a resonator having a structure in which a part of a closed-curve line is opened, the resonator performing transmission or reception of high-frequency power to or from another resonator in a noncontact manner by using electromagnetic coupling, the other resonator being disposed facing the resonator and having a shape similar to a shape of the resonator;

a driving section that rotates the resonator in a circumferential direction of the resonator within a plane formed by the closed-curve line; and a control section that controls the driving section to cause transmission and reception of the high-frequency power to be experimentally performed between the resonator and the other resonator at a plurality of positions defined by different angles in the circumferential direction of the resonator, and that sets an angle to be used in actual transmission and reception of the high-frequency power, based on power values of the high-frequency power transmitted from one of the resonator and the other resonator to the other one of the resonator and the other resonator, the power values each being detected at one of the plurality of positions of the resonator.

In another aspect, a power transmission apparatus is provided, comprising:
a first resonance apparatus; and
a second resonance apparatus, the power transmission apparatus performing transmission and reception of high-frequency power in a noncontact manner by using resonators respectively included in the first resonance apparatus and the second resonance apparatus, the resonators each having a structure in which a part of a closed-curve line is opened, wherein one of the first resonance apparatus and the second resonance apparatus includes:
  a driving section that rotates a corresponding one of the resonators in a circumferential direction of the corresponding resonator within a plane formed by the closed-curve line; and
  a control section that controls the driving section to cause transmission and reception of the high-frequency power to be experimentally performed between one of the resonators and another one of the resonators at a plurality of positions defined by different angles in the circumferential direction of the corresponding resonator, and that sets an angle to be used in actual transmission and reception of the high-frequency power, based on power values of the high-frequency power transmitted from the one of the resonators to the other one of the resonators, the power values each being detected at one of the plurality of positions of the corresponding resonator.

In still another aspect, a power transmission method is provided, which is a method for performing transmission and reception of high-frequency power in a noncontact manner by using resonators respectively included in a first resonance apparatus and a second resonance apparatus, the resonators each having a structure in which a part of a closed-curve line is opened, the power transmission method comprising:

in one of the first resonance apparatus and the second resonance apparatus, rotating a corresponding one of the resonators in a circumferential direction of the corresponding resonator within a plane formed by the closed-curve line; and causing transmission and reception of the high-frequency power to be experimentally performed between one of the resonators and another one of the resonators at a plurality of positions defined by different angles in the circumferential direction of the corresponding resonator, and setting an angle to be used in actual transmission and reception of the high-frequency power, based on power values of the high-frequency power transmitted from the one of the resonators to the other one of the resonators, the power values each being detected at one of the plurality of positions of the corresponding resonator.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DESCRIPTION OF EMBODIMENTS

Figure 1:
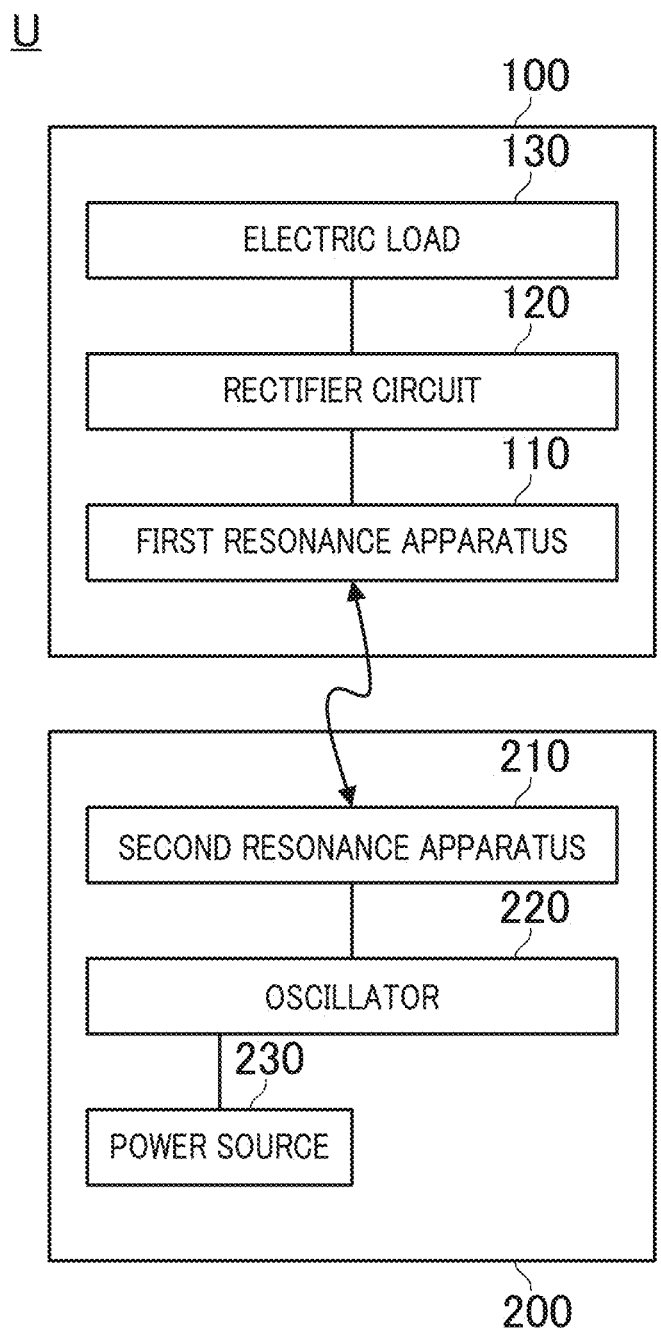
FIG. 1 is a diagram illustrating an overall configuration of a power transmission apparatus according to Embodiment 1.

Hereinafter, preferred embodiments of the present disclosure will be described in detail with reference to the attached drawings. In the specification and drawings, the components having substantially the same functions are denoted by the same reference numerals, and a duplicate description is not given.

In each figure, to clarify the positional relationships among individual components, a common orthogonal coordinate system (X, Y, Z) is illustrated in which, in the direction in which a transmitting apparatus and a receiving apparatus of a power transmission apparatus face each other, the direction of the receiving apparatus viewed from the transmitting apparatus is a plus (+) direction along the Z-axis. Hereinafter, the +Z direction will be referred to as an up direction. Note that these directions do not limit the position of the power transmission apparatus while in use.

Embodiment 1

[Overall Configuration of Power Transmission Apparatus]

Hereinafter, an example of the configuration of a power transmission apparatus according to the present embodiment will be described with reference to FIG. 1 to FIG. 4. The power transmission apparatus according to the present embodiment is applied to power transmission to an electric load.

FIG. 1 is a diagram illustrating an overall configuration of power transmission apparatus U according to the present embodiment.

Power transmission apparatus U includes receiving apparatus 100 and transmitting apparatus 200.

Receiving apparatus 100 includes, for example, first resonance apparatus 110 that receives high-frequency power from second resonance apparatus 210 of transmitting apparatus 200, rectifier circuit 120 that rectifies the high-frequency power received by first resonance apparatus 110, and electric load 130 (for example, a battery) that uses direct-current (DC) power generated through the rectification by rectifier circuit 120.

Transmitting apparatus 200 includes, for example, power source 230 (for example, a battery), oscillator 220 (for example, a semiconductor oscillator, a magnetron, or the like) that generates high-frequency power by using power supplied from power source 230, and second resonance apparatus 210 that transmits the high-frequency power obtained from oscillator 220 to first resonance apparatus 110 of receiving apparatus 100.

Receiving apparatus 100 and transmitting apparatus 200 are typically disposed so as to be separated from each other. Receiving apparatus 100 is mounted, for example, in an electric vehicle. Transmitting apparatus 200 is buried, for example, in the ground and serves as a power supply facility.

Figure 2:
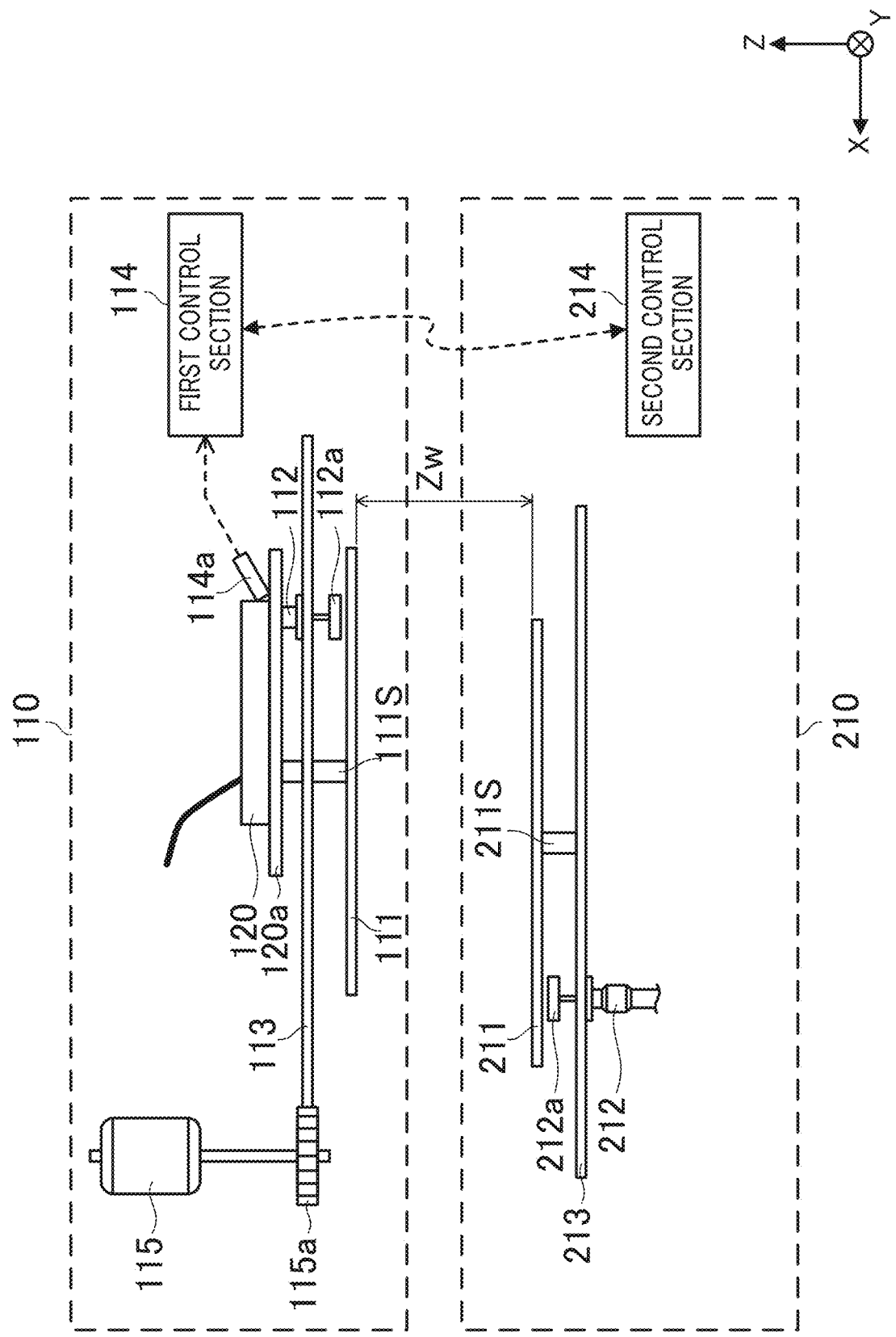
FIG. 2 is side view illustrating an example of the configurations of a first resonance apparatus and a second resonance apparatus according to the Embodiment 1.
Figure 3:
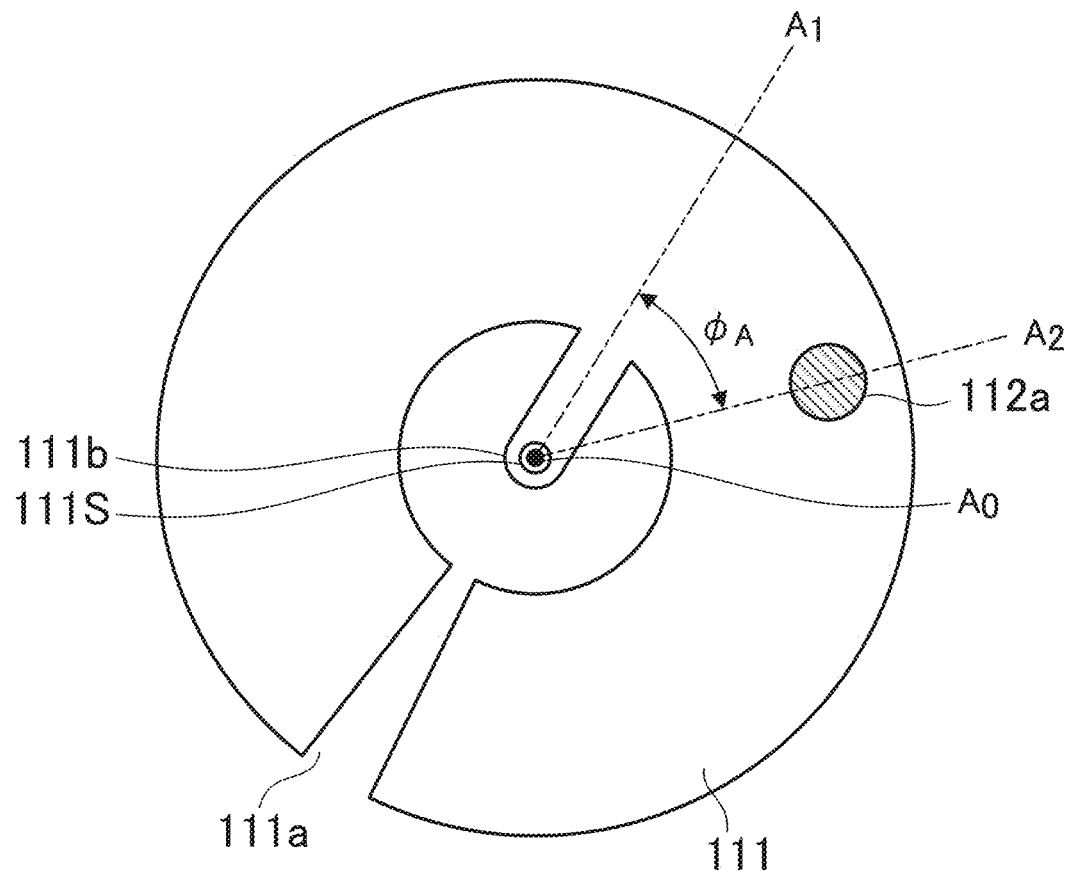
FIG. 3 is a plan view of a first resonator according to Embodiment 1.
Figure 4:
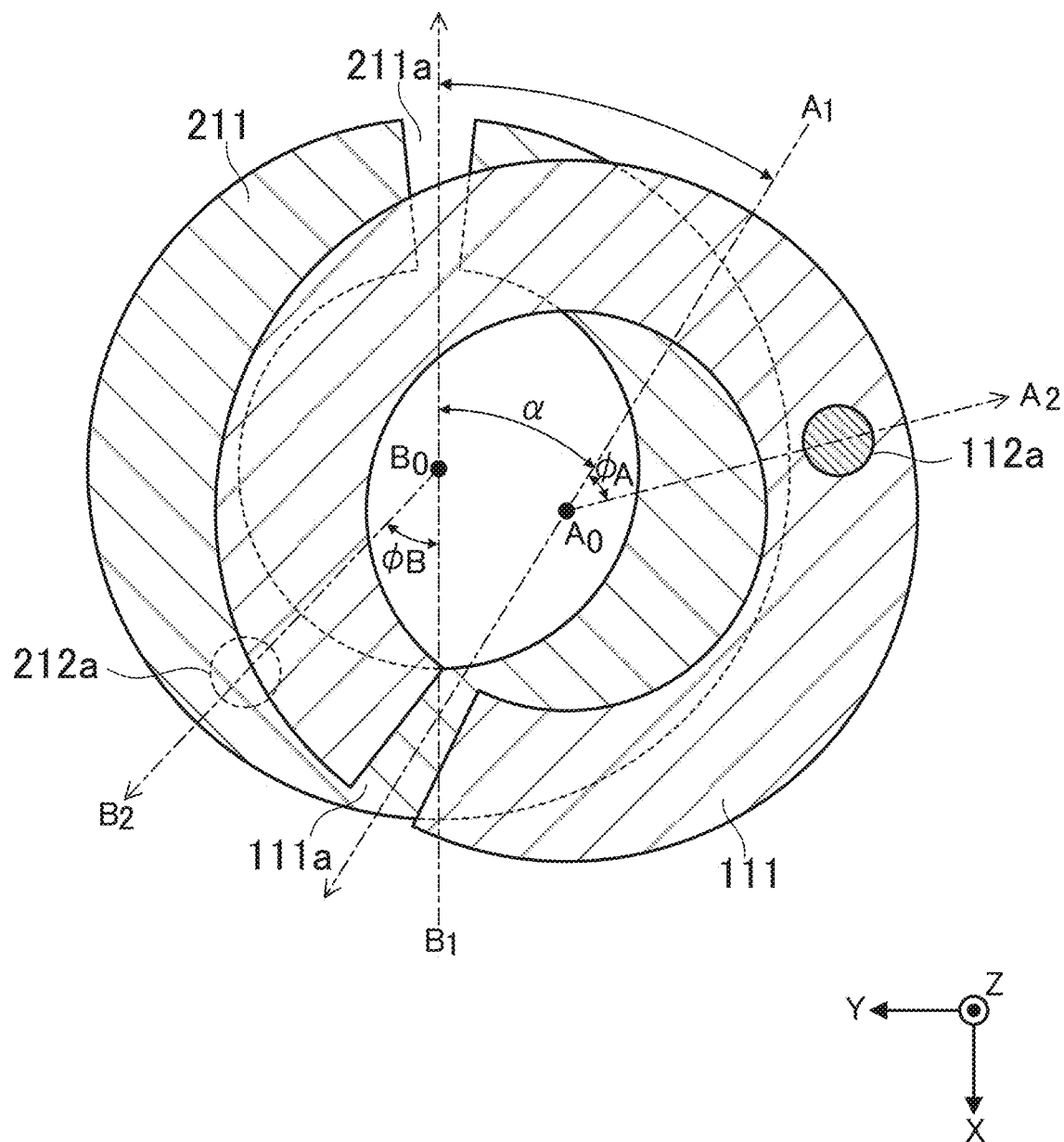
FIG. 4 is a plan view illustrating the positional relationship between the first resonator and a second resonator according to Embodiment 1.

FIG. 2 is side view illustrating an example of the configurations of first resonance apparatus 110 and second resonance apparatus 210 according to the present embodiment. FIG. 3 is a plan view of first resonator 111 according to the present embodiment. FIG. 4 is a plan view illustrating the positional relationship between first resonator 111 and second resonator 211 according to the present embodiment. In FIG. 4, protruding portions (111b and the like described below) of first resonator 111 and second resonator 211 are not illustrated.

First resonance apparatus 110 includes first resonator 111, first input/output line 112, first ground plate 113, first control section 114, and driving section 115.

When first resonator 111 is disposed facing second resonator 211, first resonator 111 electromagnetically couples with second resonator 211 and performs transmission or reception of high-frequency power to or from second resonator 211 in a noncontact manner. Here, second resonator 211 transmits high-frequency power to first resonator 111.

First resonator 111 has a structure having opening portion 111a in a part of a closed-curve line (hereinafter referred to as an "open ring") as illustrated in FIG. 3. In other words, first resonator 111 has open ends at either end in a longitudinal direction. First resonator 111 is formed of, for example, a ring-shaped metallic plate having opening portion 111a. The length of the open ring of first resonator 111 is set to, for example, about ½ of the wavelength of high-frequency power to be transmitted and received, such that the both ends thereof, where a maximum potential difference is obtained, are close to each other.

First resonator 111 is disposed so as to be electrically connected to first input/output line 112, and transmits the high-frequency power received from second resonator 211 to rectifier circuit 120 via first input/output line 112. First resonator 111 according to the present embodiment is disposed so as to be electrically connected to electrode portion 112a of first input/output line 112 at an upper-surface side (i.e., a rear-surface side) of first resonator 111.

The position at which first resonator 111 is electrically connected to electrode portion 112a of first input/output line 112 is appropriately set in consideration of impedance matching between first resonator 111 and first input/output line 112 (this will be described below with reference to FIG. 5 and FIG. 6). Hereinafter, the position at which first resonator 111 is electrically connected to electrode portion 112a will be defined by angle <$A_1A_0A_2$ formed between a line connecting center point $A_0$ of first resonator 111 and position $A_2$ at which first resonator 111 is electrically connected to electrode portion 112a and a line connecting center point $A_0$ of first resonator 111 and center position $A_1$ in the longitudinal direction of first resonator 111 in plan view (i.e., the angle difference between position $A_2$ and position $A_1$ in a circumferential direction of first resonator 111). Hereinafter, this angle will be referred to as "port angle $\phi_A$".

Note that it is desired to set port angle $\phi_A$ of first input/output line 112 with respect to first resonator 111 so as to be smaller than an angle that fully satisfies a condition of impedance matching between first resonator 111 and first input/output line 112 (this will be described below with reference to FIG. 5 and FIG. 6). In FIG. 3, port angle $\phi_A$ is about 28°.

First resonator 111 has, for example, on a side surface of first resonator 111, protruding portion 111b protruding from a center position in the longitudinal direction (i.e., a center position in the circumferential direction) of first resonator 111 toward center point $A_0$ of first resonator 111 (see FIG. 3). First resonator 111 is supported by support rod 111S disposed through protruding portion 111b and extending in an up-down direction (±Z direction). The position of protruding portion 111b typically corresponds to a zero cross point of a voltage at which first resonator 111 performs a resonance operation, and thus protruding portion 111b does not affect the resonance characteristic of first resonator 111.

First resonator 111 is disposed at a position facing first ground plate 113 that is disposed above (in the +Z direction) first resonator 111 so as to be separated from first ground plate 113. First resonator 111 is disposed so as to be located below circuit board 120a on which rectifier circuit 120 is disposed, with first ground plate 113 interposed therebetween. First resonator 111 is supported by support rod 111S extending from a lower surface of circuit board 120a. First resonator 111, first ground plate 113, and circuit board 120a are fixed to one another by support rod 111S and are configured to integrally rotate together with support rod 111S when first ground plate 113 is rotated by driving section 115 in a lateral direction (the circumferential direction within an XY plane). Accordingly, the orientation of opening portion 111a of first resonator 111 (i.e., inter-ring angle α described below) is adjustable.

First input/output line 112 is disposed so as to be electrically connected to first resonator 111 and transmits the high-frequency power received from first resonator 111 to rectifier circuit 120. First input/output line 112 is formed of, for example, a coaxial line extending downward (in a −Z direction) from the lower surface of circuit board 120a (for example, a printed circuit board (PCB)) on which rectifier circuit 120 is disposed, so as to electrically connect first resonator 111 and rectifier circuit 120. First input/output line 112 extends from the lower surface of circuit board 120a through a through hole formed in first ground plate 113 to immediately above the upper surface of first resonator 111.

Note that, when the distance between first resonator 111 and circuit board 120a is short, first input/output line 112 may be formed of, instead of a coaxial line, a metallic pin (for example, a connection pin of a diode constituting rectifier circuit 120) or the like protruding downward from circuit board 120a (rectifier circuit 120). First input/output line 112 is typically adjusted so as to have a predetermined characteristic impedance (for example, 50Ω).

First input/output line 112 has electrode portion 112a at the lower end position thereof, and electrode portion 112a is disposed facing the upper surface of first resonator 111. Accordingly, first input/output line 112 is electrically connected to first resonator 111 via electrode portion 112a. Electrode portion 112a is, for example, a plate-like electrode connected to a central conductor of the coaxial line forming first input/output line 112. Electrode portion 112a is disposed, for example, at a position facing the upper surface of first resonator 111 so as to be separated from first resonator 111 and is electrically connected to first resonator 111 by capacitive coupling. Electrode portion 112a may have any shape, for example, has a circular shape in plan view.

Note that electrode portion 112a and first resonator 111 may be electrically connected by a direct contact instead of capacitive coupling.

First ground plate 113 is disposed above (in the +Z direction) first resonator 111 so as to face first resonator 111. On a side surface of first ground plate 113, a gear groove (not illustrated) that engages with gear wheel 115a of driving section 115 is formed.

A space between first ground plate 113 and first resonator 111 serves as an air layer to form a microstrip line. Alternatively, a dielectric body other than the air layer may be present between first ground plate 113 and first resonator 111.

First control section 114 controls driving section 115 while causing transmission and reception of high-frequency power to be performed between first resonator 111 and second resonator 211. First control section 114 sets an angle in the circumferential direction of first resonator 111 (i.e., the orientation of opening portion 111a) on the basis of power values of the high-frequency power transmitted from second resonator 211 to first resonator 111, the power values being detected at individual positions of first resonator 111 (this will be described below with reference to FIG. 11).

First control section 114 mainly includes, for example, a well-known microcomputer formed of a central processing unit (CPU), a read only memory (ROM), a random access memory (RAM), and the like, and also includes a communication controller or the like for wirelessly communicating with second control section 214. First control section 114 obtains a sensor signal from current sensor 114a that detects the level of a current flowing through rectifier circuit 120 so as to be capable of measuring a transmission efficiency when transmission and reception of high-frequency power is performed between first resonator 111 and second resonator 211.

Driving section 115 rotates first resonator 111 within a plane formed by first resonator 111 (i.e., a closed-curve line that is partially opened), that is, within the XY plane, with center point $A_0$ of first resonator 111 being the rotation center. In other words, driving section 115 changes the orientation of opening portion 111a of first resonator 111 within the XY plane.

Driving section 115 is, for example, a driving motor having gear wheel 115a at its end and rotates gear wheel 115a to rotate first ground plate 113 within the XY plane, thereby rotating first resonator 111 fixed to first ground plate 113. In other words, driving section 115 according to the present embodiment integrally rotates first resonator 111, first ground plate 113, and circuit board 120a in the circumferential direction of first resonator 111. At this time, first input/output line 112 is also rotated together with circuit board 120a. Thus, when first resonator 111 is rotated, port angle $\phi_A$ is always kept constant and is always kept the same as port angle $\phi_B$ of second resonator 211.

Second resonance apparatus 210 includes second resonator 211, second input/output line 212, second ground plate 213, and second control section 214.

Second resonator 211, second input/output line 212, and second ground plate 213 have configurations similar to those of first resonator 111, first input/output line 112, and first ground plate 113, respectively.

Second resonator 211 has a structure having opening portion 211a in a part of a closed-curve line. Second resonator 211 is formed of, for example, a ring-shaped metallic plate having opening portion 211a. The length of the open ring of second resonator 211 is set to, for example, about ½ of the wavelength of high-frequency power to be transmitted and received, such that the both ends thereof, where a maximum potential difference is obtained, are close to each other. Typically, resonators of substantially the same size are used as first resonator 111 and second resonator 211 so that both the resonators have the same resonant frequency.

Second resonator 211 is disposed so as to be electrically connected to second input/output line 212, and obtains the high-frequency power transmitted from oscillator 220 via second input/output line 212. Second resonator 211 is disposed, for example, so as to be electrically connected to electrode portion 212a of second input/output line 212 at a lower-surface side of second resonator 211.

The position at which second resonator 211 is electrically connected to electrode portion 212a of second input/output line 212 is appropriately set so as to achieve impedance matching between second resonator 211 and second input/output line 212 (this will be described below with reference to FIG. 5 and FIG. 6). Hereinafter, the position at which second resonator 211 is electrically connected to electrode portion 212a will be defined by angle $<B_1B_0B_2$ formed between a line connecting center point $B_0$ of second resonator 211 and position $B_2$ at which second resonator 211 is electrically connected to electrode portion 212a and a line connecting center point $B_0$ of second resonator 211 and center position $B_1$ in a longitudinal direction of second resonator 211 in plan view (i.e., the angle difference between position $B_2$ and position $B_1$ in a circumferential direction of second resonator 211). Hereinafter, this angle will be referred to as "port angle line $\phi_B$". Port angle $\phi_B$ is typically set to be substantially the same as port angle $\phi_A$ (here, about 28°).

Similarly to first resonator 111, second resonator 211 has, on a side surface of second resonator 211, a protruding portion (not illustrated) protruding from a center position in the longitudinal direction (i.e., a center position in the circumferential direction) of second resonator 211 toward center point $B_0$ of second resonator 211. Second resonator 211 is supported by support rod 211S disposed through the protruding portion and extending in the up-down direction.

Second resonator 211 is disposed at a position facing second ground plate 213 that is disposed below (in the −Z direction) of second resonator 211 so as to be separated from second ground plate 213. Second resonator 211 is supported by support rod 211S extending upward from an upper surface of second ground plate 213.

Second input/output line 212 transmits the high-frequency power received from oscillator 220 to second resonator 211. Second input/output line 212 is formed of, for example, a coaxial line extending in the up-down direction so as to electrically connect second resonator 211 and oscillator 220. Second input/output line 212 extends from an upper surface of a circuit board (not illustrated) which is disposed below second ground plate 213 and on which oscillator 220 is disposed, through a through hole formed in second ground plate 213 to immediately below a lower surface of second resonator 211. Second input/output line 212 is typically adjusted so as to have a predetermined characteristic impedance (for example, 50Ω).

Second input/output line 212 has electrode portion 212a at the upper end position thereof, and electrode portion 212a is disposed facing the lower surface of second resonator 211. Accordingly, second input/output line 212 is electrically connected to second resonator 211 via electrode portion 212a. Electrode portion 212a is, for example, a plate-like electrode connected to a central conductor of the coaxial line forming second input/output line 212. Electrode portion 212a is disposed, for example, at a position facing the lower surface of second resonator 211 so as to be separated from second resonator 211 and is electrically connected to second resonator 211 by capacitive coupling. Electrode portion 212a may have any shape, for example, has a circular shape in plan view.

Second ground plate 213 is disposed below (in the −Z direction) second resonator 211 so as to face second resonator 211.

Second control section 214 communicates with first control section 114 and provides an instruction to perform power transmission or the like to oscillator 220 when first resonator 111 and second resonator 211 are disposed facing each other.

Second control section 214 mainly includes, for example, a well-known microcomputer formed of a CPU, a ROM, a RAM, and the like, and also includes a communication controller or the like for wirelessly communicating with first control section 114.

When power transmission is performed in power transmission apparatus U, first resonator 111 and second resonator 211 are disposed facing each other such that the internal diameters thereof overlap each other (typically such that center point $A_0$ of first resonator 111 and center point $B_0$ of second resonator 211 overlap each other) in plan view (see FIG. 4). First resonator 111 and second resonator 211 are disposed facing each other with a space, a dielectric material, or both of them interposed therebetween.

At this time, first resonator 111 and second resonator 211 are disposed such that an angle formed between a line connecting opening portion 111a and center point $A_0$ of first resonator 111 and a line connecting opening portion 211a and center point $B_0$ of second resonator 211 in plan view (i.e., the angle difference between opening portion 111a of first resonator 111 and opening portion 211a of second resonator 211 in the circumferential direction of the rings, in other words, angle α in FIG. 4) is, for example, 90° or larger, more preferably 180°.

Hereinafter, to define the positional relationship between first resonator 111 and second resonator 211, the angle formed between the line connecting opening portion 111a and center point $A_0$ of first resonator 111 and the line connecting opening portion 211a and center point $B_0$ of second resonator 211 in plan view will be referred to as "inter-ring angle α". The distance in a height direction (±Z direction) between first resonator 111 and second resonator 211 will be referred to as "inter-resonator distance $Z_W$".

[Function of Adjusting Inter-Ring Angle of Power Transmission Apparatus]

A description will be given of a function of adjusting inter-ring angle α between first resonator 111 and second resonator 211 included in power transmission apparatus U according to the present embodiment with reference to FIG. 5 to FIG. 11.

FIG. 5 to FIG. 10 illustrate results of electromagnetic-field analysis simulations of transmission efficiency η (i.e., transmittance S21) observed when high-frequency power is transmitted from first resonance apparatus 110 to second resonance apparatus 210 under various conditions.

In the individual simulations, for example, an open ring resonator that has an internal diameter of 27 mm and an external diameter of 74 mm and that is configured to have a resonant frequency (fundamental-mode frequency f0 described below) of 920 MHz is used as each of first resonator 111 and second resonator 211.

Hereinafter, under the assumption that port angle $\phi_A$ of first input/output line 112 with respect to first resonator 111 and port angle $\phi_b$ of second input/output line 212 with respect to second resonator 211 are set to the same angle, port angle $\phi_A$ and port angle $\phi_B$ will be referred to as "port angle ϕ" when both are not particularly distinguished from each other. In addition, first resonator 111 and second resonator 211 will be collectively referred to as "resonators 111 and 211" when both are not particularly distinguished from each other. First input/output line 112 and second input/output line 212 will be collectively referred to as "input/output lines 112 and 212" when both are not particularly distinguished from each other.

In general, a frequency characteristic related to a transmittance when transmission and reception of high-frequency power is performed between two resonators (here, resonators 111 and 211) is that, when the two resonators are close to each other, resonant frequency f0 unique to the resonators (hereinafter referred to as fundamental-mode frequency f0) is separated into two resonant frequencies, high-frequency-side resonant frequency f1 and low-frequency-side resonant frequency f2, because of an electromagnetic interaction between the two resonators (see FIG. 5 and FIG. 6). As the coupling strength between the two resonators increases, high-frequency-side resonant frequency f1 and low-frequency-side resonant frequency f2 shift in the direction away from fundamental-mode frequency f0.

At this time, the strength of electromagnetic coupling between the two resonators is generally expressed as coupling coefficient k by the following equation 1.

[1]

$$k = \frac{2(f_2 - f_1)}{f_2 + f_1} \quad (1)$$

Note that, within the band between high-frequency-side resonant frequency f1 and low-frequency-side resonant frequency f2, uniform transmission efficiency η (transmittance) is not necessarily achieved, but transmission efficiency η in an intermediate region of the frequency band decreases depending on the state of electromagnetic coupling between the two resonators (this is referred to as a double-humped frequency characteristic).

This type of power transmission apparatus is normally configured to perform power transmission by using fundamental-mode frequency f0. Thus, if power transmission is performed in the state of the double-humped frequency characteristic, transmission efficiency η decreases. For example, if a frequency characteristic having high transmission efficiency η over a wide band is obtained, power transmission can be performed with high transmission efficiency η even if the usage environment of the resonators changes and the high-frequency-side resonant frequency and the low-frequency-side resonant frequency separated from each other shift.

It is generally known that a resonator has an internal Q value (represented by Qu) that is determined by the relationship between accumulated energy and loss and that maximum value ηmax of transmission efficiency η between two resonators is defined by a kQu product, which is the product of coupling coefficient k and the internal Q value (see, for example, NPL 2). According to this theory, the kQu product is expressed by equation 2, and maximum transmission efficiency ηmax that can be achieved in the resonators is expressed by equation 3. These values can be calculated from S parameters by using actual measurement, a simulation, or the like.

[2]

$$kQu = \frac{|Z_{12}|}{\sqrt{|R|}} \quad (2)$$

[3]

$$\eta_{max} = 1 - \frac{2}{1 + \sqrt{1 + (kQu)^2}} \quad (3)$$

Note that whether or not maximum transmission efficiency ηmax can be achieved is determined by the impedance matching between a resonator and an input/output line.

According to NPL 1, in an open ring resonator, impedance matching for obtaining a Butterworth (or maximally flat) frequency characteristic in which a transmission efficiency does not decrease (i.e., the frequency characteristic is not double-humped) even at a band center frequency can be adjusted by a port angle at which an input/output line is connected to the resonator (here, port angles φ defining the positions at which electrode portions 112a and 212a of input/output lines 112 and 212 are electrically connected to resonators 111 and 211). Specifically, according to NPL 1, in an open ring resonator, it is necessary to establish the relationship expressed by the following equation 4 between the k value of the coupling coefficient and the external Q value of the resonator (represented by Qe) to obtain a Butterworth frequency characteristic between two separated resonant frequencies f1 and f2.

[4]

$$\frac{1}{k} = Q_e \quad (4)$$

In addition, according to NPL 1, the external Q value of an open ring resonator is expressed by the following equation 5, and the external Q value can be changed by adjusting the port angle at which the input/output line is connected to the resonator.

[5]

$$Q_e = \frac{\pi}{2} \frac{Z_S}{Z_R} \frac{1}{\sin^2\left(\frac{\varphi}{2}\right)} \quad (5)$$

(in which $Z_S$ represents the characteristic impedance of the input/output line, $Z_R$ represents the characteristic impedance of the ring circumference portion of the resonator, and φ represents the port angle.)

The external Q value is a parameter indicating the strength of coupling between the main body of the resonator and the input/output line. It is understood from equation 5 that, as the port angle increases, the reactance component of input impedance decreases and the external Q value decreases. On the other hand, as the port angle becomes closer to 0°, the reactance component of input impedance increases and the external Q value increases.

The kQe product used as a reference in equation 4 is an indicator indicating the degree of smoothness of power transmission in a case where the state of electromagnetic coupling between the two resonators (i.e., coupling coefficient k) and the coupling state between the input/output line and the resonator (i.e., external Q value) are taken into consideration. It is estimated that a state in which kQe=1 (the state expressed by equation 4) is a state in which power transmission from the transmission side to the reception side is performed most smoothly, a state in which kQe>1 is a state in which electromagnetic energy is extremely accumulated in the resonator, and a state in which kQe<1 is a state in which the supply and discharge of electromagnetic energy from the resonator to the input/output line is excessive compared to power transmission between the resonators.

Figure 5:
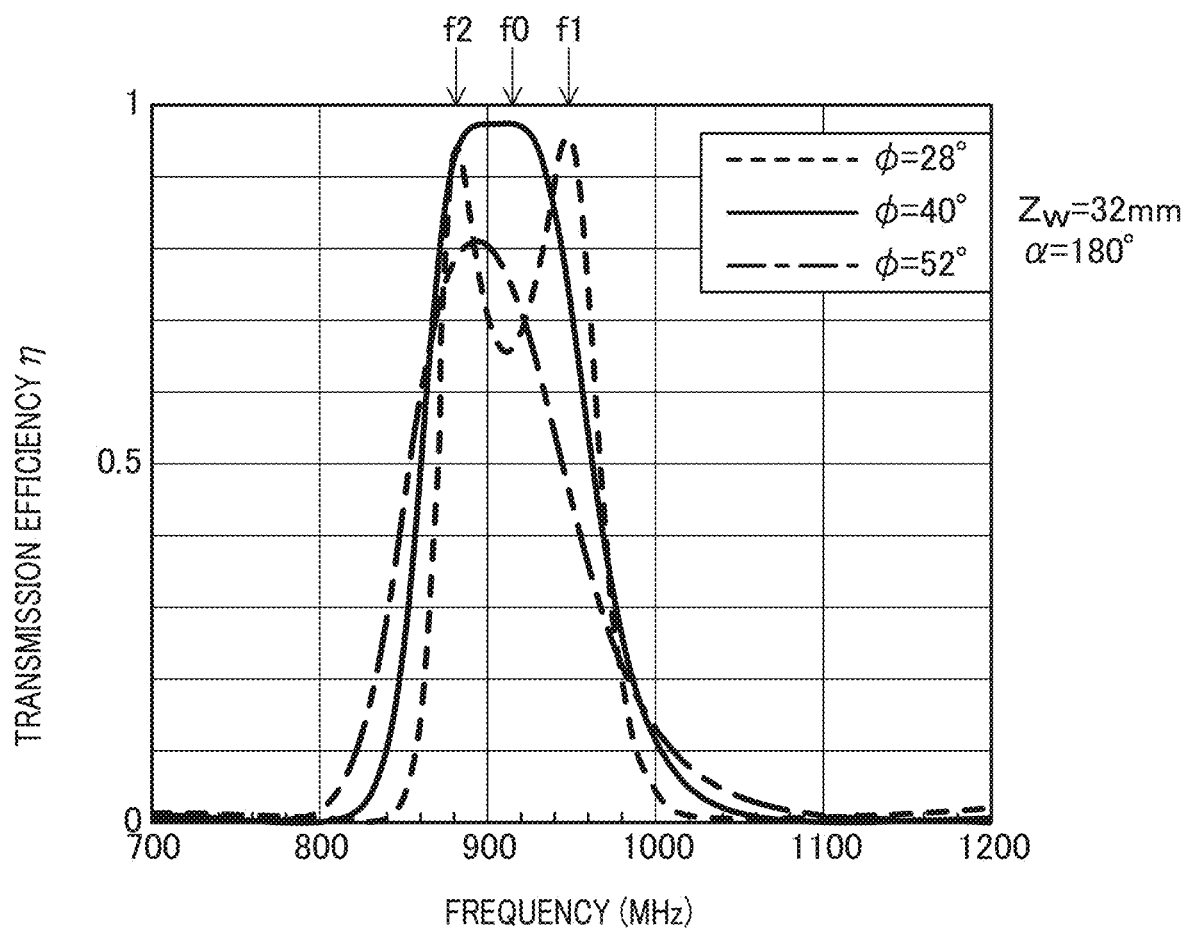
FIG. 5 is a graph illustrating an example of the relationship between a port angle (the positions at which input/output lines are connected to the resonators) and a transmission efficiency in the power transmission apparatus.

FIG. 5 is a graph illustrating an example of the relationship between port angle φ (the positions at which input/output lines 112 and 212 are connected to resonators 111 and 211) and transmission efficiency η in power transmission apparatus U according to the present embodiment.

The individual lines in the graph in FIG. 5 represent transmission efficiencies η in the following conditions.
Broken line: transmission efficiency η when port angle φ=28°
Solid line: transmission efficiency η when port angle φ=40°
Chain line: transmission efficiency η when port angle φ=52°
Here, inter-resonator distance $Z_W$ is set to 32 mm.

In FIG. 5, the condition in which port angle φ=40° is appropriate for obtaining a Butterworth frequency characteristic, and transmission efficiency η is substantially flat around 920 MHz, which is a center frequency (fundamental-mode frequency f0 of resonators 111 and 211). This state corresponds to the state in which kQe=1 expressed by equation 4. On the other hand, when port angle φ is 28°, which is smaller than 40°, the external Q value increases and as a result kQe>1. In this case, the frequency characteristic of transmission efficiency η is double-humped. At this time, transmission efficiency η near the center frequency corresponds to the valley in the graph, and transmission efficiency η at the target frequency decreases. On the other hand, when port angle φ is 52°, which is larger than 40°, the external Q value decreases and kQe<1. In this case, the frequency characteristic is single-humped, and the peak of transmission efficiency η near the center frequency decreases.

In general, in an open ring resonator, the condition of impedance matching is fully satisfied when the external Q determined by port angle φ satisfies Qe=1/k. In power transmission apparatus U according to the present embodiment, the condition of impedance matching is fully satisfied when port angle φ=40°. However, if this angle is achieved by an optimum positional relationship, the k value decreases when the rings are displaced. As a result, 1/k increases, Qe becomes an excessively small value, and transmission efficiency η decreases. Thus, port angle φ is set to be small in advance (in this case 28°) and Qe is set to be higher than in the optimum state. On the other hand, inter-ring angle α is caused to deviate from 180° at which the maximum efficiency is obtained, so as to decrease the k value and achieve Qe=1/k. When the positional relationship between the rings deviates from the optimum condition, the k value further decreases. However, the k value can be increased by changing the inter-ring angle α toward 180°, and Qe=1/k can be maintained.

Figure 6:
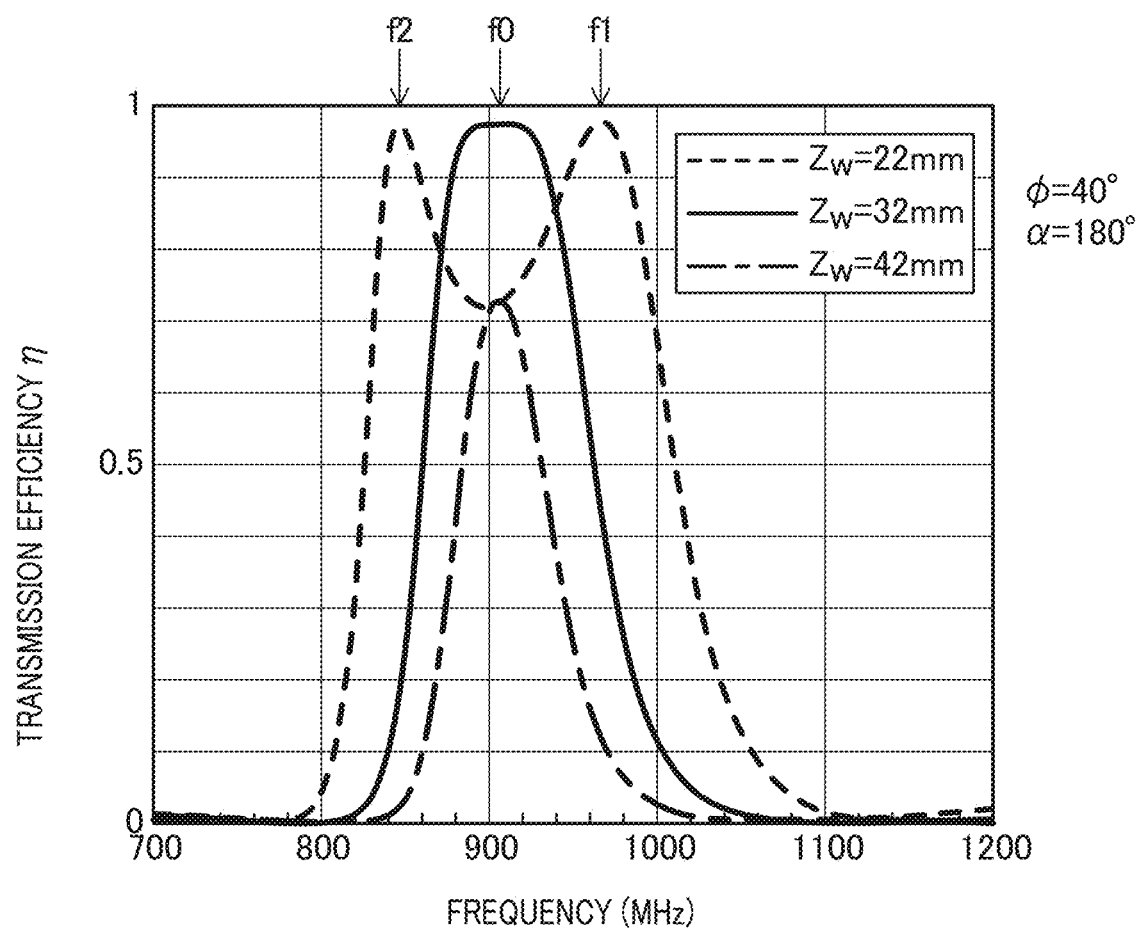
FIG. 6 is a graph illustrating an example of the relationship between an inter-resonator distance (the distance between the first resonator and the second resonator in a ±Z direction) and a transmission efficiency in the power transmission apparatus.

FIG. 6 is a graph illustrating an example of the relationship between inter-resonator distance $Z_W$ (the distance between first resonator 111 and second resonator 211 in the ±Z direction) and transmission efficiency η in power transmission apparatus U according to the present embodiment.

The individual lines in the graph in FIG. 6 represent transmission efficiencies η in the following conditions.

Broken line: transmission efficiency η when inter-resonator distance $Z_W$=22 mm
Solid line: transmission efficiency η when inter-resonator distance $Z_W$=32 mm
Chain line: transmission efficiency η when inter-resonator distance $Z_W$=42 mm
Here, port angle ϕ is set to 40°.

When inter-resonator distance $Z_W$ is 32 mm, the condition is similar to that of the solid line in FIG. 5, and thus kQe=1. On the other hand, when inter-resonator distance $Z_W$ is 22 mm, coupling coefficient k increases and kQe>1. As a result, the frequency characteristic is double-humped, and transmission efficiency η decreases near the center frequency although coupling coefficient k increases. On the other hand, when inter-resonator distance $Z_W$ is 42 mm, coupling coefficient k decreases, kQe<1, the frequency characteristic is single-humped, and transmission efficiency η decreases in the entire range including the center frequency.

As described above, in any case, a Butterworth frequency characteristic is obtained and transmission efficiency η at the center frequency (fundamental-mode frequency f0) is maximum when kQe=1. When kQe<1, the frequency characteristic is single-humped and the peak of transmission efficiency η decreases. On the other hand, when kQe>1, the frequency characteristic is double-humped, transmission efficiency η is high at resonant frequency f1 and resonant frequency f2 on the high frequency side and low frequency side of fundamental-mode frequency f0, and transmission efficiency η is low at fundamental-mode frequency f0. In other words, transmission efficiency η is maximum when kQe=1, and transmission efficiency η at the center frequency (i.e., the transmission frequency for performing power transmission) decreases when kQe is larger or smaller.

Note that it is often difficult or complicated to actually change port angle ϕ or inter-resonator distance $Z_W$. Thus, in power transmission apparatus U according to the present embodiment, when inter-resonator distance $Z_W$ between first resonator 111 and second resonator 211 is changed or when a displacement between first resonator 111 and second resonator 211 occurs, inter-ring angle α (the angle difference between opening portion 111a of first resonator 111 and opening portion 211a of second resonator 211 in the circumferential direction of the rings) is changed to maintain the state in which kQe=1.

Figure 7:
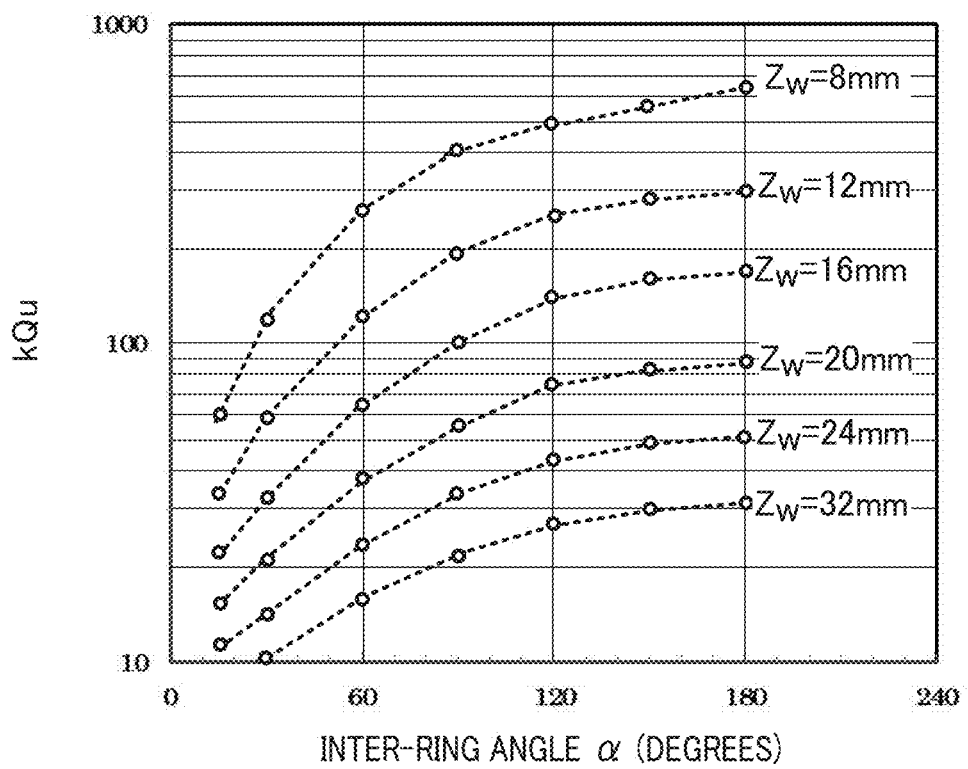
FIG. 7 is a graph illustrating an example of the relationship between an inter-ring angle and a kQu product in the power transmission apparatus.

FIG. 7 is a graph illustrating an example of the relationship between inter-ring angle α and kQu product in power transmission apparatus U according to the present embodiment.

Normally, the Qu value of a resonator does not depend on inter-ring angle α, and thus FIG. 7 illustrates changes in the k value depending on inter-ring angle α. As illustrated in FIG. 7, coupling coefficient k is minimum when inter-ring angle α is 0°, and increases as inter-ring angle α increases. Coupling coefficient k is maximum when inter-ring angle α is 180°. This is because, according to estimation, when inter-ring angle α is 180°, both magnetic resonance and electric resonance are in the same phase between first resonator 111 and second resonator 211 and the resonance intensity is the highest.

It is understood from FIG. 7 that coupling coefficient k can be adjusted by adjusting inter-ring angle α even when inter-resonator distance $Z_W$ between first resonator 111 and second resonator 211 is changed or when a displacement between first resonator 111 and second resonator 211 occurs. In other words, the state in which kQe=1 can be realized by adjusting inter-ring angle α.

Figure 8:
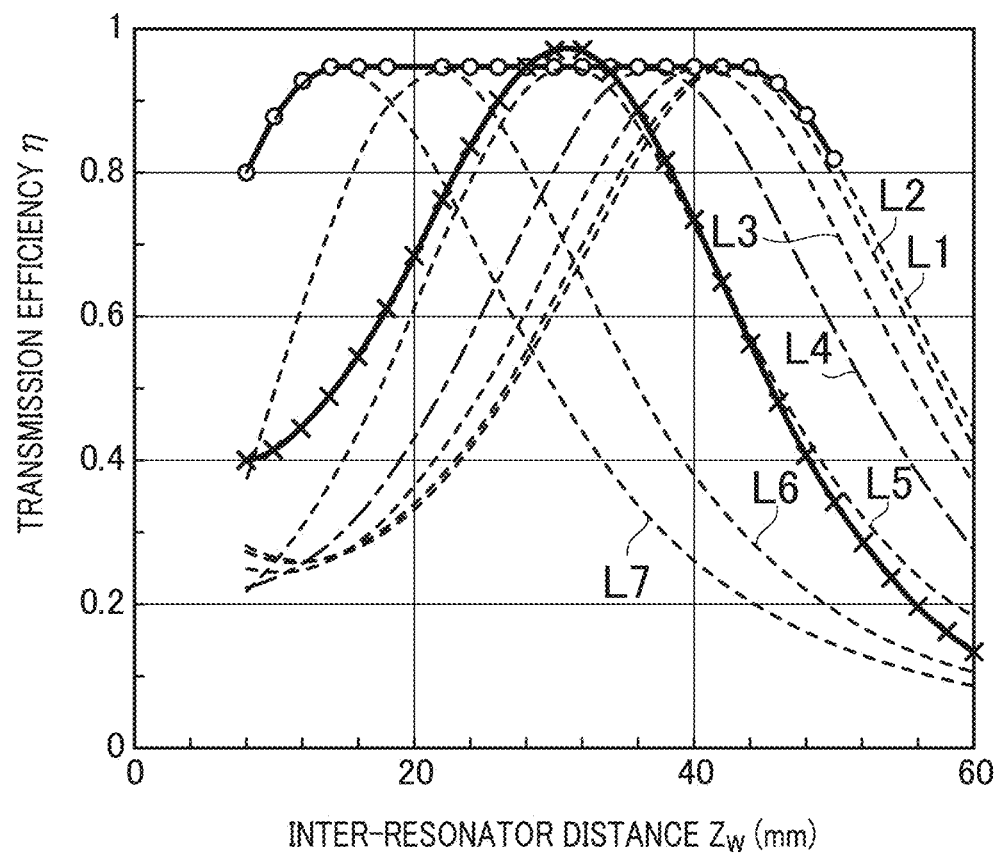
FIG. 8 is a graph illustrating the behaviors of a transmission efficiency detected when the inter-ring angle is adjusted to address changes in the inter-resonator distance in the power transmission apparatus according to Embodiment 1.

FIG. 8 is a graph illustrating the behaviors of transmission efficiency η detected when inter-ring angle α is adjusted to address changes in inter-resonator distance $Z_W$ in power transmission apparatus U according to the present embodiment.

This simulation calculates transmission efficiency η in the case of changing inter-resonator distance $Z_W$ in a state in which center point $A_0$ of first resonator 111 and center point $B_0$ of second resonator 211 match in plan view in power transmission apparatus U according to the present embodiment. This simulation uses high-frequency power of 920 MHz corresponding to fundamental-mode frequency f0 of resonators 111 and 211.

The individual lines in the graph in FIG. 8 represent the following.
Solid line: transmission efficiency η when port angle ϕ is set to 40° and inter-ring angle α is set to 180°
Broken lines: transmission efficiencies η when port angle ϕ is set to 28° and inter-ring angle α is changed from 180° to 15° (Broken line L1: α=180°, Broken line L2: α=150°, Broken line L3: α=120°, Broken line L4: α=90°, Broken line L5: α=60°, Broken line L6: α=30°, Broken line L7: α=15°)
Dotted line: the line formed by connecting peak values of transmission efficiencies η of individual broken lines L1 to L7

In FIG. 8, the horizontal axis represents inter-resonator distance $Z_W$ (mm) and the vertical axis represents transmission efficiency η.

As is understood from broken line L1, under the condition in which port angle ϕ is 28° (corresponding to port angle ϕ set to resonators 111 and 211 according to the present embodiment) and inter-ring angle α is 180°, transmission efficiency η of 95% can be achieved when inter-resonator distance $Z_W$ is 44 mm. This is because, when port angle ϕ is 28°, the state in which kQe=1 is established when inter-ring angle α=180° and inter-resonator distance $Z_W$=44 mm. However, under the condition in which port angle ϕ=28° and inter-ring angle α=180°, transmission efficiency η decreases as inter-resonator distance $Z_W$ decreases from 44 mm. This is because, under this condition, as inter-resonator distance $Z_W$ decreases, coupling coefficient k increases, kQe becomes larger than 1, the frequency characteristic changes to double-humped, and transmission efficiency η decreases at the center frequency.

Regarding this point, it is understood from individual broken lines L1 to L7 that inter-resonator distance $Z_W$ with which transmission efficiency η of 95% can be obtained decreases as inter-ring angle α decreases. Specifically, inter-resonator distance $Z_W$ with which transmission efficiency η of 95% can be obtained changes as follows in accordance with inter-ring angle α.

Inter-ring angle α=180° (broken line L1): inter-resonator distance $Z_W$=44 mm
Inter-ring angle α=150° (broken line L2): inter-resonator distance $Z_W$=42 mm
Inter-ring angle α=120° (broken line L3): inter-resonator distance $Z_W$=40 mm
Inter-ring angle α=90° (broken line L4): inter-resonator distance $Z_W$=35 mm
Inter-ring angle α=60° (broken line L5): inter-resonator distance $Z_W$=32 mm
Inter-ring angle α=30° (broken line L6): inter-resonator distance $Z_W$=23 mm
Inter-ring angle α=15° (broken line L7): inter-resonator distance $Z_W$=12 mm This is because, as inter-ring angle α decreases, coupling coefficient k decreases and inter-resonator distance $Z_W$ decreases to cancel out an increase in coupling coefficient k, and thus the state in which kQe=1 can be maintained. Accordingly, it is understood that, as a result of changing inter-ring angle α, transmission efficiency η of 95% can be achieved when inter-resonator distance $Z_W$ is in the range from 12 mm to 44 mm.

On the other hand, if port angle φ is set to 40°, the condition of impedance matching is satisfied most, and thus high transmission efficiency η of 97% or more can be obtained when inter-resonator distance $Z_W$=32 mm (see the solid line). Note that, as is understood from the solid line, the range in which transmission efficiency η is 95% or more is the range in which inter-resonator distance $Z_W$ is 28 mm to 34 mm, that is, in the range of only 6 mm.

As a result of setting port angle φ to a value (here, φ=28°) smaller than a port angle satisfying the matching condition most (here, φ=40°) and adjusting inter-ring angle α, the range of inter-resonator distance $Z_W$ in which transmission efficiency η of 95% can be achieved expands to five times or more the range of inter-resonator distance $Z_W$ in which transmission efficiency η of 95% can be achieved when inter-ring angle α is fixed.

Figure 9:
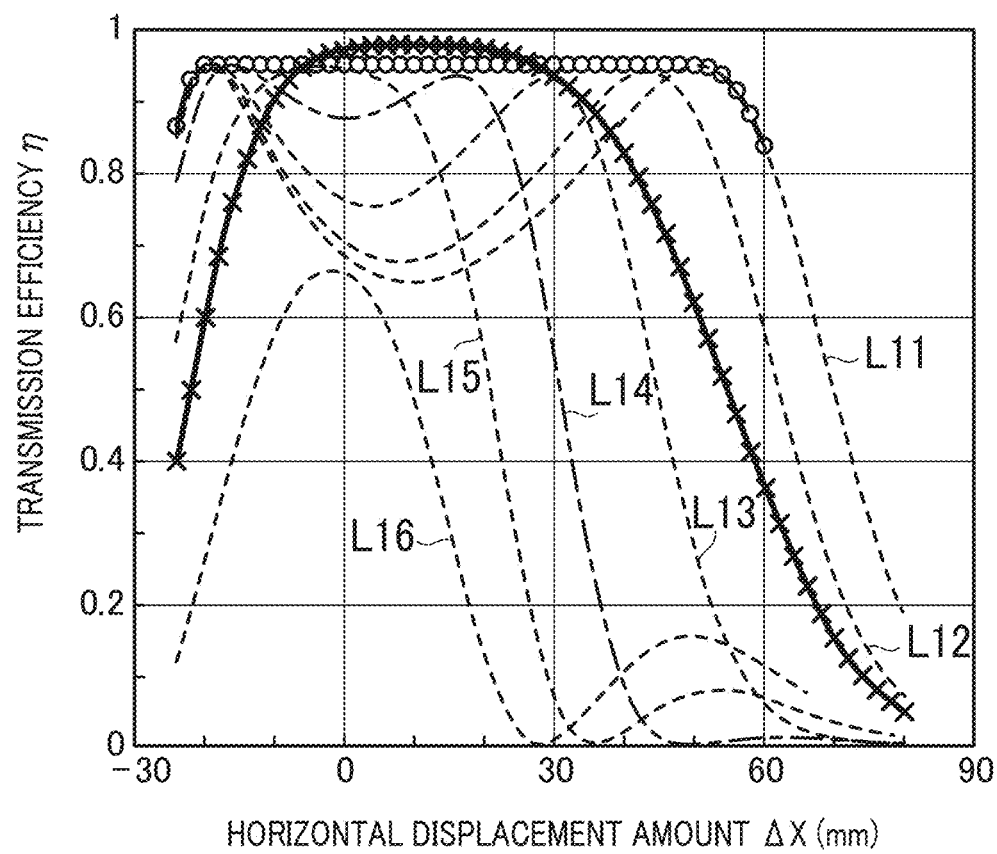
FIG. 9 is a graph illustrating the behaviors of a transmission efficiency detected when the inter-ring angle is adjusted to address a displacement in a ±X direction in the power transmission apparatus according to Embodiment 1.

FIG. 9 is a graph illustrating the behaviors of transmission efficiency η detected when inter-ring angle α is adjusted to address a displacement in the ±X direction in power transmission apparatus U according to the present embodiment.

The individual lines in the graph in FIG. 9 represent the following.

Solid line: transmission efficiency η when port angle φ is set to 40° and inter-ring angle α is set to 180°

Broken lines: transmission efficiencies η when port angle φ is set to 28° and inter-ring angle α is changed from 180° to 30° (Broken line L11: α=180°, Broken line L12: α=150°, Broken line L13: α=120°, Broken line L14: α=90°, Broken line L15: α=60°, Broken line L16: α=30°)

Dotted line: the line formed by connecting peak values of transmission efficiencies η of individual broken lines L11 to L16

In FIG. 9, the horizontal axis represents a displacement amount (mm) in the ±X direction from the state in which inter-ring angle α is 180° (hereafter referred to as horizontal displacement amount ΔX), and the vertical axis represents transmission efficiency η (%). The 0 point in the horizontal axis represents the position at which center point $A_0$ of resonator 111 and center point $B_0$ of resonator 211 overlap each other, and the +X direction represents a displacement amount in the direction in which opening portion 111a and opening portion 211a overlap each other. Inter-resonator distance $Z_W$ is set to 32 mm.

As is understood from broken line L11, under the condition in which port angle φ is 28° (corresponding to port angle φ set to resonators 111 and 211 according to the present embodiment) and inter-ring angle α is 180°, transmission efficiency η of 95% can be achieved when horizontal displacement amount ΔX=50 mm, and transmission efficiency η decreases as horizontal displacement amount ΔX decreases from 50 mm. This is because, when port angle φ is 28°, the state in which kQe=1 is established when inter-ring angle α=180° and horizontal displacement amount ΔX=50 mm, and as horizontal displacement amount ΔX decreases to be smaller than 50 mm, coupling coefficient k increases, kQe becomes larger than 1, and the frequency characteristic changes to double-humped.

Regarding this point, it is understood from individual broken lines L11 to L16 that horizontal displacement amount ΔX with which transmission efficiency η of 95% can be obtained decreases as inter-ring angle α decreases. Specifically, horizontal displacement amount ΔX with which transmission efficiency η of 95% can be obtained changes as follows in accordance with inter-ring angle α.

Inter-ring angle α=180° (broken line L11); horizontal displacement amount ΔX=50 mm Inter-ring angle α=150° (broken line L12); horizontal displacement amount ΔX=40 mm Inter-ring angle α=120° (broken line L13); horizontal displacement amount ΔX=30 mm Inter-ring angle α=90° (broken line L14); horizontal displacement amount ΔX=20 mm Inter-ring angle α=60° (broken line L15); horizontal displacement amount ΔX=0 mm This is because, as inter-ring angle α decreases, coupling coefficient k decreases and horizontal displacement amount ΔX decreases to cancel out an increase in coupling coefficient k, and thus the state in which kQe=1 can be maintained. Accordingly, it is understood that, as a result of changing inter-ring angle α, transmission efficiency η of 95% can be maintained when horizontal displacement amount ΔX is in the range from −20 mm to +52 mm.

On the other hand, if port angle φ is set to 40°, the condition of impedance matching is satisfied most, and thus high transmission efficiency η of 97% or more can be obtained when horizontal displacement amount ΔX is small (see the solid line). Note that, as is understood from the solid line, the range in which transmission efficiency η is 95% or more is the range in which horizontal displacement amount ΔX is −6 mm to +28 mm, that is, in the range of only 34 mm.

As a result of setting port angle φ to a value (here, φ=28°) smaller than a port angle satisfying the matching condition most (here, φ=40°) and adjusting inter-ring angle α, the range of horizontal displacement amount ΔX in which transmission efficiency η of 95% can be achieved expands to twice or more the range of horizontal displacement amount ΔX in which transmission efficiency η of 95% can be achieved when inter-ring angle α is fixed.

In the individual lines in the graph in FIG. 9, the reason for that horizontal displacement amount ΔX with which high transmission efficiency η can be obtained is larger in the +X direction than in the −X direction is that a displacement in the direction in which opening portion 111a of resonator 111 and opening portion 211a of resonator 211 overlap each other keeps coupling coefficient k high.

Figure 10:
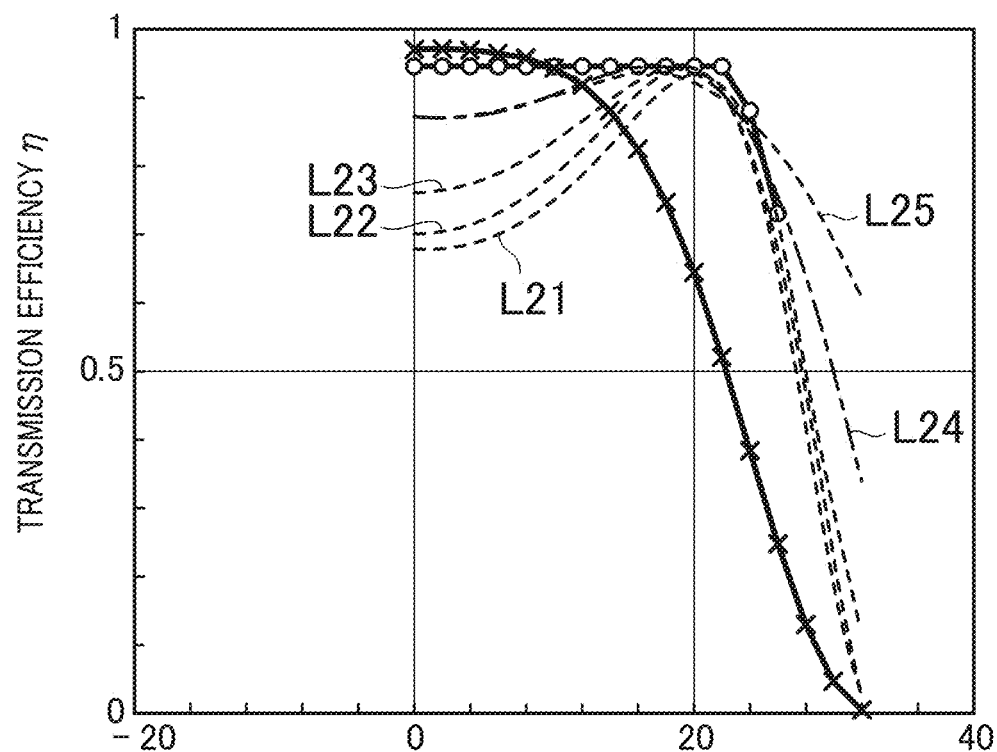
FIG. 10 is a graph illustrating the behaviors of a transmission efficiency detected when the inter-ring angle is adjusted to address a displacement in a ±Y direction in the power transmission apparatus according to Embodiment 1.

FIG. 10 is a graph illustrating the behaviors of transmission efficiency η detected when inter-ring angle α is adjusted to address a displacement in the ±Y direction in power transmission apparatus U according to the present embodiment.

The individual lines in the graph in FIG. 10 represent the following.

Solid line: transmission efficiency η when port angle φ is set to 40° and inter-ring angle α is set to 180°

Broken lines: transmission efficiencies η when port angle φ is set to 28° and inter-ring angle α is changed from 180° to 60° (Broken line L21: α=180°, Broken line L22: α=150°, Broken line L23: α=120°, Broken line L24: α=90°, Broken line L25: α=60°)

Dotted line: the line formed by connecting peak values of transmission efficiencies η of individual broken lines L21 to L25

In FIG. 10, the horizontal axis represents a displacement amount (mm) in the ±Y direction (hereafter referred to as vertical displacement amount ΔY), and the vertical axis represents transmission efficiency η (%). The 0 point in the horizontal axis represents the position at which center point $A_0$ of resonator 111 and center point $B_0$ of resonator 211 overlap each other. A displacement in the ±Y direction is symmetrical in the +Y direction and the −Y direction, and thus only a displacement in the +Y direction is illustrated here. Inter-ring angle α is set to 180°. Inter-resonator distance $Z_W$ is set to 32 mm.

As is understood from broken line L21, under the condition in which port angle φ is 28° (corresponding to port angle φ set to resonators 111 and 211 according to the present embodiment) and inter-ring angle α is 180°, transmission efficiency η of 95% can be achieved when vertical displacement amount ΔY=20 mm, and transmission efficiency η decreases as vertical displacement amount ΔY decreases from 20 mm. This is because, when port angle φ is 28°, the state in which kQe=1 is established when inter-ring angle α=180° and vertical displacement amount ΔY=20 mm, and as vertical displacement amount ΔY decreases to be smaller than 20 mm, coupling coefficient k increases, kQe becomes larger than 1, and the frequency characteristic changes to double-humped.

Regarding this point, it is understood from individual broken lines L21 to L25 that vertical displacement amount ΔY with which transmission efficiency η of 95% can be obtained decreases as inter-ring angle α decreases. Specifically, vertical displacement amount ΔY with which transmission efficiency η of 95% can be obtained changes as follows in accordance with inter-ring angle α.

Inter-ring angle α=180° (broken line L21); vertical displacement amount ΔY=20 mm
Inter-ring angle α=150° (broken line L22); vertical displacement amount ΔY=18 mm
Inter-ring angle α=120° (broken line L23); vertical displacement amount ΔY=17 mm
Inter-ring angle α=90° (broken line L24); vertical displacement amount ΔY=16 mm
Inter-ring angle α=60° (broken line L25); vertical displacement amount ΔY=15 mm This is because, as inter-ring angle α decreases, coupling coefficient k decreases and vertical displacement amount ΔY decreases to cancel out an increase in coupling coefficient k, and thus the state in which kQe=1 can be maintained. Accordingly, it is understood that, as a result of changing inter-ring angle α, transmission efficiency η of 95% can be maintained when vertical displacement amount ΔY is in the range from −22 mm to +22 mm.

On the other hand, if port angle φ is set to 40°, the condition of impedance matching is satisfied most, and thus high transmission efficiency η of 97% or more can be obtained when vertical displacement amount ΔY is small (see the solid line). Note that, as is understood from the solid line, the range in which transmission efficiency η is 95% or more is the range in which vertical displacement amount ΔY is −10 mm to +10 mm, that is, in the range of only 20 mm.

As a result of setting port angle φ to a value (here, φ=28°) smaller than a port angle satisfying the matching condition most (here, φ=40°) and adjusting inter-ring angle α, the range of vertical displacement amount ΔY in which transmission efficiency η of 95% can be achieved expands to twice or more the range of vertical displacement amount ΔY in which transmission efficiency η of 95% can be achieved when inter-ring angle α is fixed.

Figure 11:
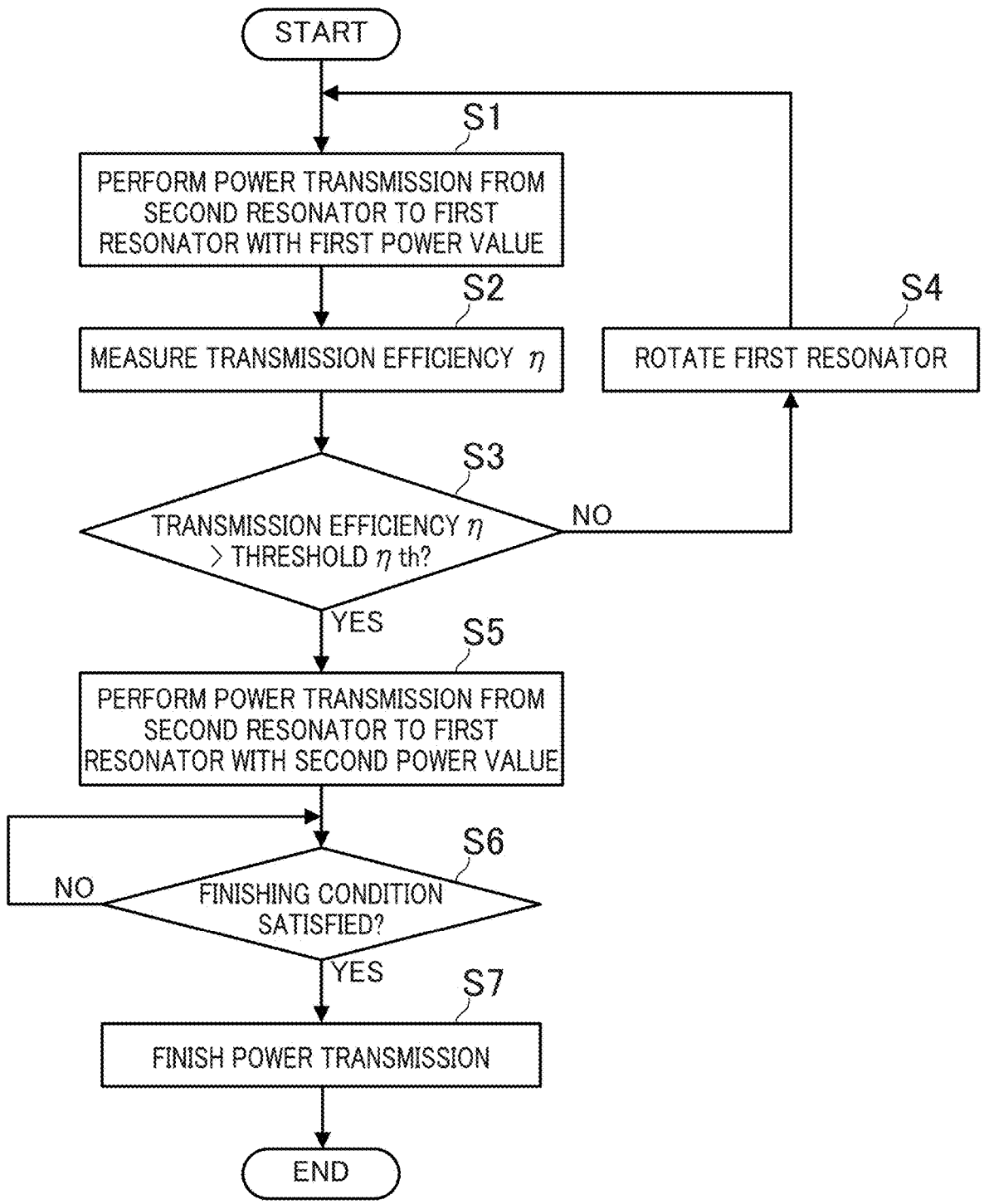
FIG. 11 is a flowchart illustrating an operation of the power transmission apparatus according to Embodiment 1.

FIG. 11 is a flowchart illustrating an operation of power transmission apparatus U according to the present embodiment. The flowchart illustrated in FIG. 11 includes, for example, the steps sequentially executed by first control section 114 in cooperation with second control section 214 in accordance with a computer program.

In step S1, first control section 114 instructs second control section 214 to cause power transmission from second resonator 211 to first resonator 111 to be performed with a first power value. At this time, second control section 214 controls oscillator 220 in response to the instruction from first control section 114 to perform power transmission.

Step S1 is the step of experimental power transmission for specifying inter-ring angle α that can ensure high transmission efficiency η. Thus, the first power value designated in step S1 is set to a power value lower than a power value used for power transmission according to the present embodiment in step S5 (second power value).

In step S2, first control section 114 measures transmission efficiency η. At this time, first control section 114 detects a power value of the power transmitted from second resonator 211 to first resonator 111 on the basis of a detection signal from current sensor 114a. Subsequently, first control section 114 compares the detected power value with the first power value indicated in the instruction to second control section 214, thereby measuring transmission efficiency η.

In step S3, first control section 114 determines whether or not transmission efficiency η measured in step S2 is higher than threshold $η_{th}$ (for example, 95%). If transmission efficiency η measured in step S2 is higher than threshold $η_{th}$ (YES in step S3), the process proceeds to step S5. If transmission efficiency η measured in step S2 is lower than or equal to threshold $η_{th}$ (NO in step S3), the process proceeds to step S4.

In step S3, first control section 114 may perform determination on the basis of the detected power value of the power transmitted from second resonator 211 to first resonator 111, instead of transmission efficiency η.

In step S4, first control section 114 controls driving section 115 to rotate first resonator 111 in the circumferential direction of first resonator 111 by a predetermined angle (for example, 1°). Subsequently, the process returns to step S1, where first control section 114 performs again power transmission and measurement of transmission efficiency η. Steps S1 to S4 are repeatedly performed to specify inter-ring angle α that can ensure high transmission efficiency η.

In step S5, first control section 114 instructs second control section 214 to cause power transmission from second resonator 211 to first resonator 111 to be performed with a second power value. Step S5 corresponds to power transmission according to the present embodiment.

In step S6, first control section 114 waits for a determination that a condition for finishing power transmission is satisfied (NO in step S6). If the finishing condition is satisfied (YES in step S6), the process proceeds to step S7. First control section 114 determines that the finishing condition is satisfied, for example, when the battery serving as electric load 130 reaches a fully charged state.

In step S7, first control section 114 instructs second control section 214 to finish the power transmission.

Power transmission apparatus U is capable of performing power transmission from transmitting apparatus 200 to receiving apparatus 100 at high transmission efficiency η with the above-described series of steps.

[Advantages]

As described above, resonance apparatus 110 according to the present embodiment includes:
resonator 111 that has a structure in which a part of a closed-curve line is opened and that performs transmission or reception of high-frequency power to or from resonator 211 in a noncontact manner by using electromagnetic coupling, resonator 211 being disposed facing resonator 111 and having a shape similar to a shape of resonator 111;

driving section 115 that rotates resonator 111 in a circumferential direction of resonator 111 within a plane formed by the closed-curve line; and control section 114 that controls driving section 115 to cause transmission and reception of the high-frequency power to be experimentally performed between resonator 111 and resonator 211 at a plurality of positions defined by different angles in the circumferential direction of resonator 111, and that sets an angle to be used in actual transmission and reception of the high-frequency power, based on power values of the high-frequency power transmitted from one of resonator 111 and resonator 211 to another one of resonator 111 and resonator 211, the power values each being detected at one of the plurality of positions of resonator 111.

Therefore, with resonance apparatus 110 according to the present embodiment, power transmission can be performed while ensuring high transmission efficiency η even when inter-resonator distance $Z_W$ between two resonators 111 and 211 deviates from a reference distance or when a displacement occurs between two resonators 111 and 211.

MODIFICATION EXAMPLE

In the above embodiment, a description has been given of a method for specifying inter-ring angle α such that transmission efficiency η is higher than or equal to a threshold, as an example of a method for setting inter-ring angle α by first control section 114.

Alternatively, instead of using the forgoing method, first control section 114 may measure transmission efficiencies η at individual positions in the circumferential direction of entire first resonator 111 to generate a profile of transmission efficiencies η at the individual positions in the circumferential direction of first resonator 111, and may set inter-ring angle α so as to maximize transmission efficiency η.

In this mode, first control section 114 measures, for example, transmission efficiencies η at individual positions between 0° to 180° (for example, individual positions at an interval of 1°) in the circumferential direction of first resonator 111 to generate a profile of transmission efficiencies η. Subsequently, first control section 114 sets inter-ring angle α so as to maximize transmission efficiency η on the basis of the profile of transmission efficiencies η.

Accordingly, power transmission can be performed with maximized transmission efficiency η.

Embodiment 2

Next, resonance apparatuses 110 and 210 according to Embodiment 2 will be described with reference to FIG. 12.

Figure 12:
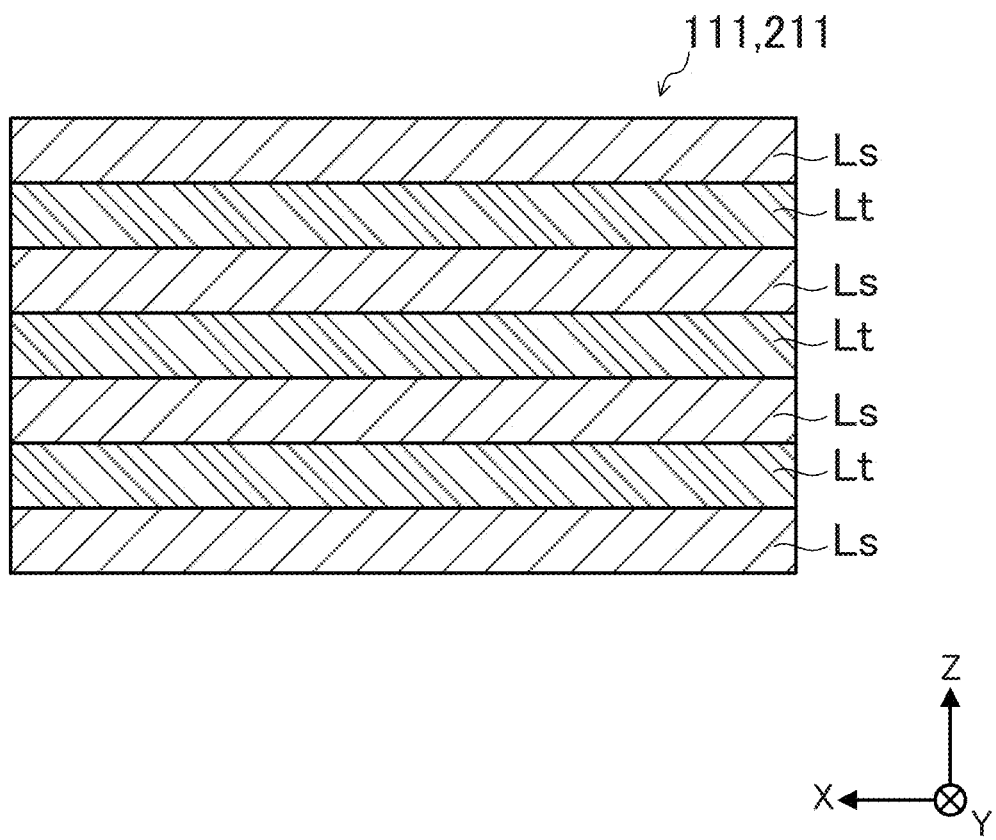
FIG. 12 is an enlarged side view of resonators according to Embodiment 2.

FIG. 12 is an enlarged side view of resonators 111 and 211 according to Embodiment 2. Also in the present embodiment, resonators 111 and 211 have configurations similar to each other. Hereinafter, only the configuration of resonator 111 will be described.

Resonators 111 and 211 according to the present embodiment are different from those in Embodiment 1 in having a structure in which metallic layers Ls and insulating layers Lt are alternately stacked.

In general, one of factors in decreasing a transmission efficiency in a power transmission apparatus is the resistance of a metallic plate forming a resonator. Even if the resonator is formed of copper, aluminum, gold, or the like having a low resistance, it is not possible to ignore the loss resulting from the resistance thereof. In particular, when the frequency is high, only several μm from the surface contributes to conduction because of skin effects, and it is not effective to increase the thickness of the metal.

Regarding this point, resonators 111 and 211 according to the present embodiment have a structure in which metallic layers Ls and insulating layers Lt are alternately stacked, and thus a skin portion used for transmission during power transmission is increased in accordance with the number of metallic layers. Accordingly, the resistance of resonators 111 and 211 during power transmission can be reduced.

Figure 13:
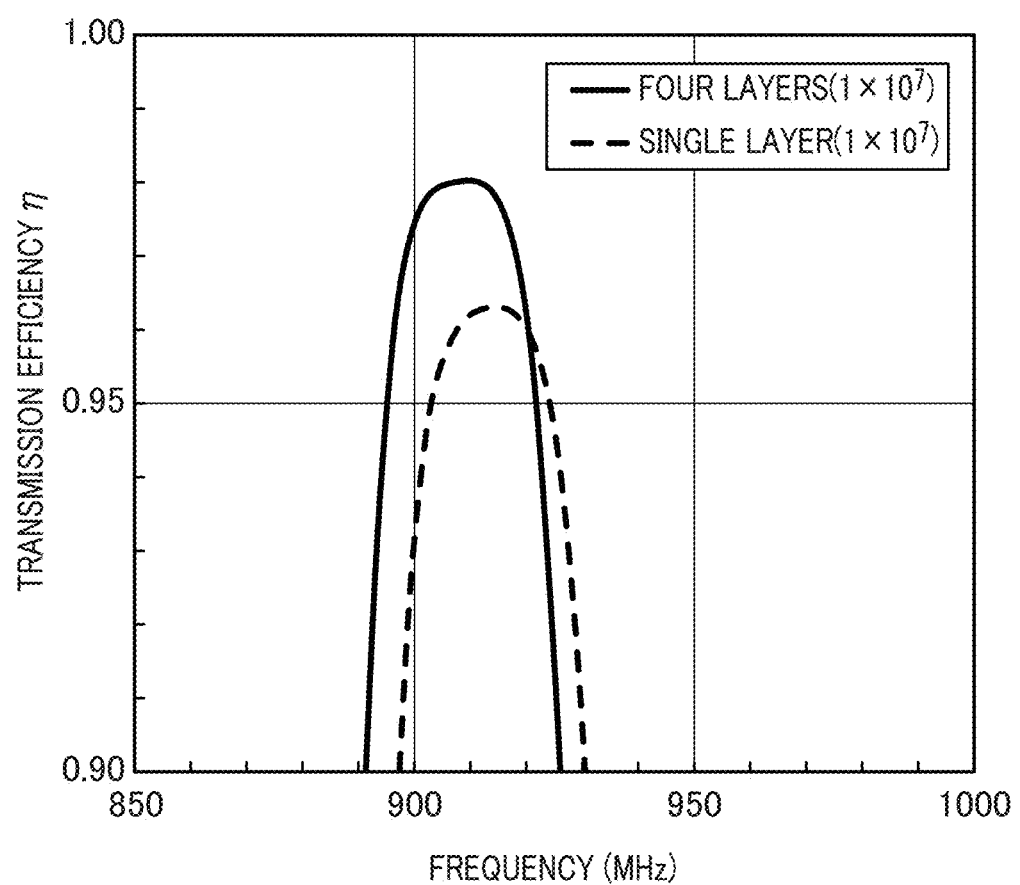
FIG. 13 is a graph for comparing a transmission efficiency when power transmission is performed by using a multilayer resonator and a transmission efficiency when power transmission is performed by using a single-layer resonator in an electromagnetic-field analysis simulation according to Embodiment 2.

FIG. 13 is a graph for comparing transmission efficiency η (solid line) when power transmission is performed by using a multilayer resonator (corresponding to the resonator according to the present embodiment) and transmission efficiency η (broken line) when power transmission is performed by using a single-layer resonator in an electromagnetic-field analysis simulation.

This simulation uses a single-layer resonator formed of a metallic plate having a thickness of 1 mm and a resistance of $1 \times 10^7$ S/m, and a multilayer resonator formed of stacked four metallic plates each having a thickness of 18 μm and a resistance of $1 \times 10^7$ S/m. A dielectric plate having a thickness of 0.4 mm and a permittivity of 2.16 is disposed between the individual metallic plates. The total thickness of the metallic plates of the multilayer resonator is ⅒ or less of the thickness of the metallic plate of the single-layer resonator.

It is understood from the simulation result that use of the multilayer resonator increases transmission efficiency η by 1% or more compared to the case of using the single-layer resonator. This result is equivalent to the case of a single-layer metallic plate having a metal conductivity increased to about 3.5 times. When the multilayer resonator is used, transmission efficiency η does not simply increase in proportional to the number of layers, but the resistance is lower than that of the single-layer resonator and high transmission efficiency η is achieved.

Such conductive loss occurs mainly in resonators 111 and 211 but also occurs in ground plates 113 and 213. Thus, it is desired to apply the multilayer structure also in ground plates 113 and 213. Accordingly, transmission efficiency η can be further increased.

As described above, in resonance apparatuses 110 and 210 according to the present embodiment, the resistances of resonators 111 and 211 can be decreased and thus transmission efficiency η can be further increased.

Embodiment 3

Next, resonance apparatuses 110 and 210 according to Embodiment 3 will be described with reference to FIG. 14 and FIG. 15.

Figure 14:
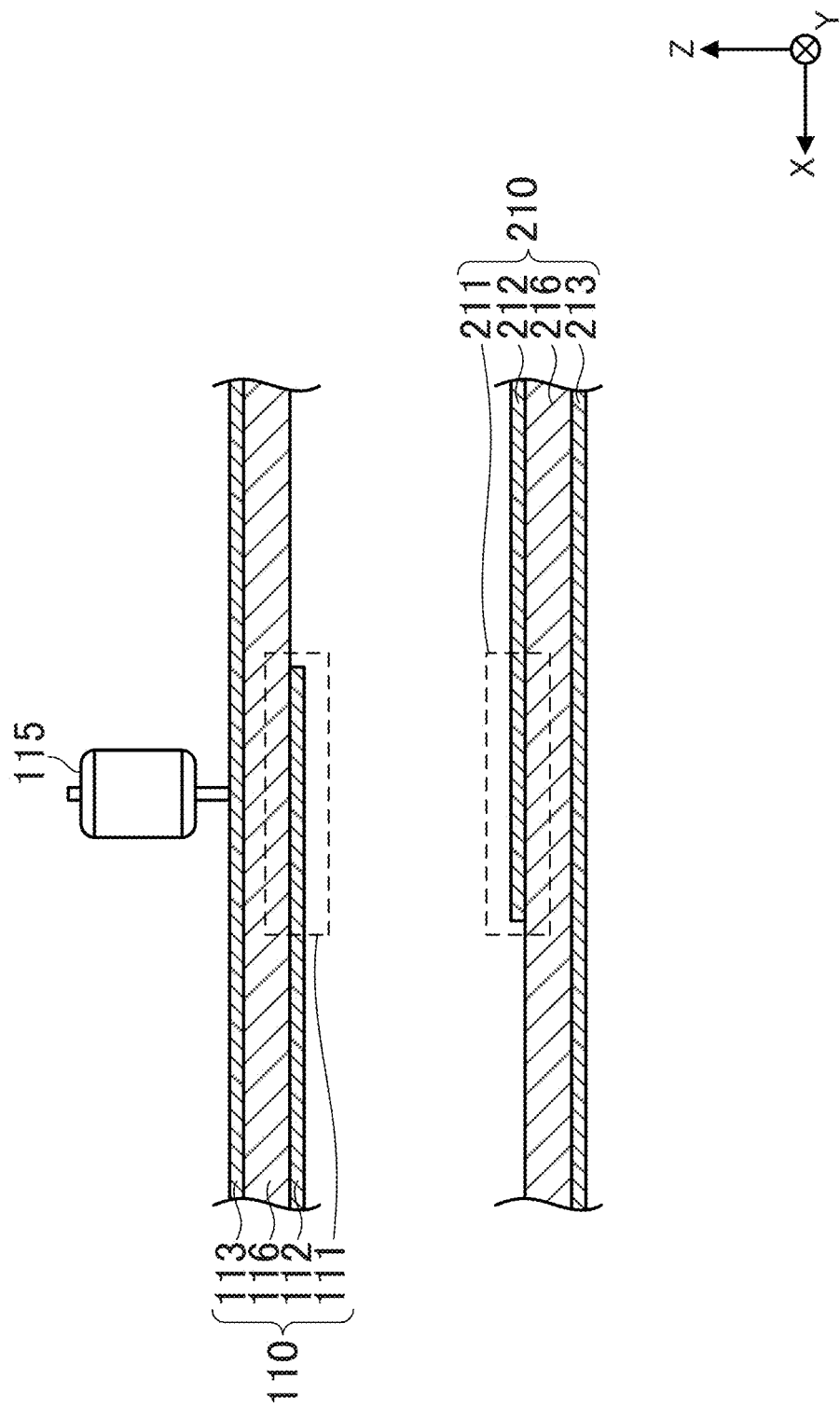
FIG. 14 is a side view of resonance apparatuses according to Embodiment 3.
Figure 15:
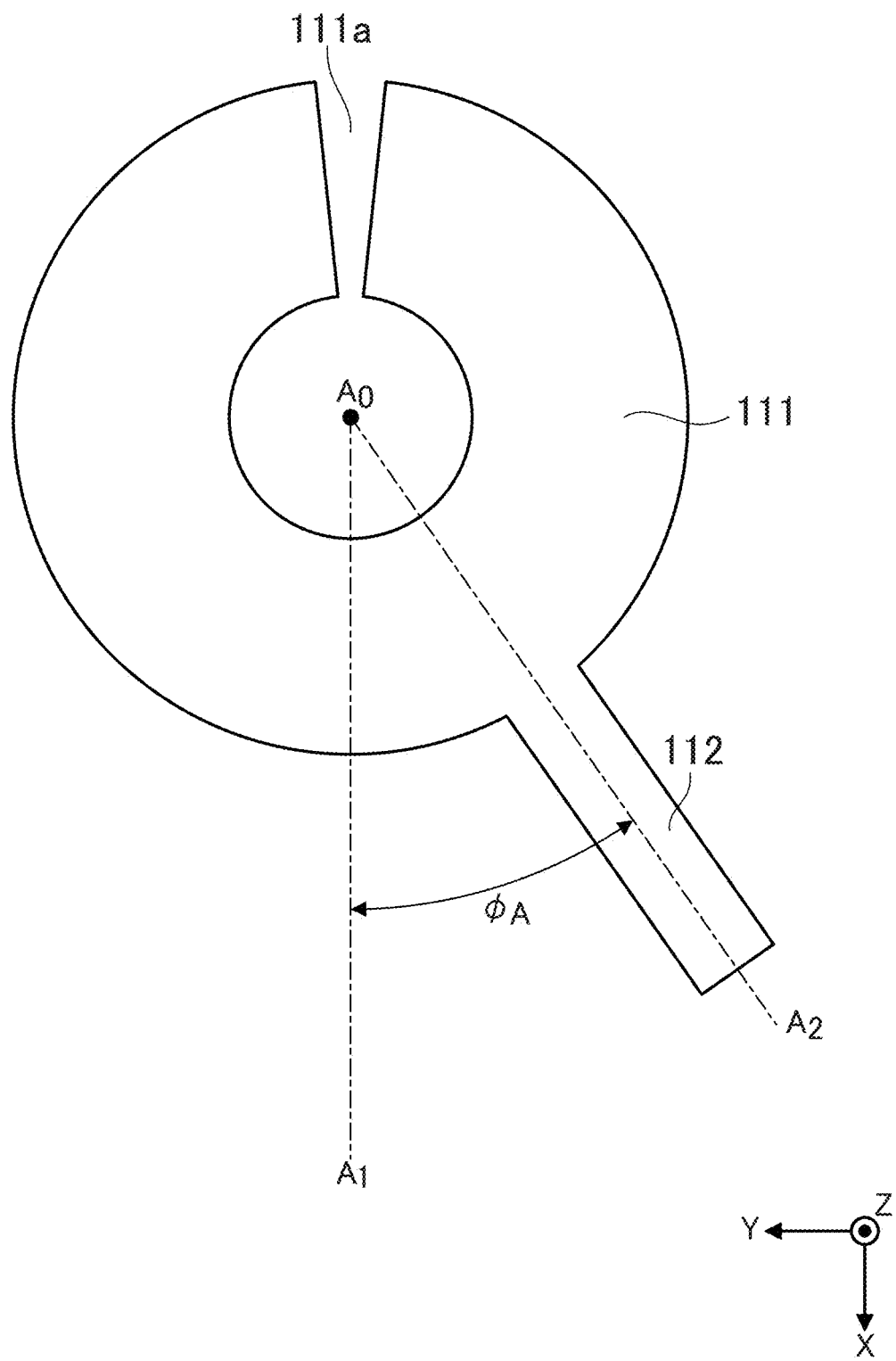
FIG. 15 is a plan view of the resonance apparatus according to Embodiment 3.

FIG. 14 is a side view of resonance apparatuses 110 and 210 according to Embodiment 3. FIG. 15 is a plan view of resonance apparatus 110 according to Embodiment 3.

Resonance apparatus 110 according to the present embodiment is different from the resonance apparatus according to Embodiment 1 in that input/output line 112 and resonator 111 are disposed in the same circuit board 116.

Circuit board 116 according to the present embodiment is, for example, a PCB, and is a substrate on which rectifier circuit 120 or the like is disposed. Resonator 111 and input/output line 112 according to the present embodiment are formed of a conductor pattern that is formed on a surface of circuit board 116. In addition, ground plate 113 is formed on a rear surface of circuit board 116.

Input/output line 112 according to the present embodiment is, for example, a microstrip, and is connected to resonator 111 at the position defined by predetermined port angle ϕ as in resonance apparatus 110 according to Embodiment 1. In circuit board 116, a vertical via wiring line or the like connected to input/output line 112 may be provided.

Driving section 115 according to the present embodiment supports circuit board 116 at the position of the center point of resonator 111 on the rear surface of circuit board 116. Driving section 115 is configured to be capable of rotating circuit board 116 within the XY plane with the center point of resonator 111 being the rotation center. Specifically, driving section 115 rotates resonator 111 together with circuit board 116, thereby adjusting the angle in the circumferential direction of resonator 111 (i.e., inter-ring angle α).

Resonance apparatus 210 according to the present embodiment has a configuration similar to that of resonance apparatus 110, and input/output line 212 and resonator 211 are disposed in the same circuit board 216.

Also in resonance apparatus 110 according to the present embodiment, as in resonance apparatus 110 according to Embodiment 1, inter-ring angle α between two resonators 111 and 211 can be adjusted. Accordingly, even when inter-resonator distance $Z_W$ between two resonators 111 and 211 deviates from a reference distance or when a displacement occurs between two resonators 111 and 211, power transmission can be performed while ensuring high transmission efficiency Other Embodiments The present disclosure is not limited to the above embodiments, and various modifications can be applied.

In the above embodiments, the shapes in which opening portions 111a and 211a are formed in parts of ring-shaped closed-curve lines are described as an example of the shapes of resonators 111 and 211. The shapes of resonators 111 and 211 can be variously changed and may be, for example, substantially rectangular loop shapes having opening portions 111a and 211a formed in parts thereof. The ring length of each of resonators 111 and 211 may be an odd multiple of ½ of the wavelength of high-frequency power.

In the above embodiments, resonator 111 and resonator 211 have the same shape. Alternatively, resonator 111 and resonator 211 may have different shapes. For example, resonator 111 and resonator 211 may have different ring sizes or different ring widths. In this case, port angle $\phi_A$ of resonator 111 and port angle $\phi_B$ of resonator 211 may be made adjustable separately.

In the above embodiments, electrode portions 112a and 212a of input/output lines 112 and 212 are circular as an example. The shapes of electrode portions 112a and 212a can be variously changed and may be, for example, open ring shapes similar to the shapes of resonators 111 and 211.

Specific examples of the present disclosure have been described above. These are merely examples and do not limit the claims. The techniques described in the claims include modifications or changes of the above-described specific examples.

INDUSTRIAL APPLICABILITY

A resonance apparatus according to the present disclosure is capable of addressing a displacement between two resonators.

REFERENCE SIGNS LIST

U Power transmission apparatus
100 Receiving apparatus
110 First resonance apparatus
111 First resonator
111S Support rod
111a Opening portion
111b Protruding portion
112 First input/output line
112a Electrode portion
113 First ground plate
114 First control section
114a Current sensor
115 Driving section
115a Gear wheel
116 Circuit board
120 Rectifier circuit
120a Circuit board
130 Electric load
200 Transmitting apparatus
210 Second resonance apparatus
211 Second resonator
211S Support rod
211a Opening portion
212 Second input/output line
212a Electrode portion
213 Second ground plate
214 Second control section
216 Circuit board
220 Oscillator
230 Power source
$Z_W$ Inter-resonator distance
α Inter-ring angle
ϕ Port angle

The invention claimed is:

1. A resonance apparatus, comprising:
a resonator having a structure in which a part of a closed-curve line is opened, the resonator performing transmission or reception of high-frequency power to or from another resonator in a noncontact manner by using electromagnetic coupling, the other resonator being disposed facing the resonator and having a shape similar to a shape of the resonator;
a driving section that rotates the resonator in a circumferential direction of the resonator within a plane formed by the closed-curve line; and
a control section that controls the driving section to cause transmission and reception of the high-frequency power to be experimentally performed between the resonator and the other resonator at a plurality of positions defined by different inter-ring angles, the inter-ring angles being angles between an opening portion of the resonator and an opening portion of the other resonator in the circumferential direction, by rotating the resonator around the central axis of the resonator in a state where the resonator and the other resonator are parallel to each other, and that sets a first inter-ring angle from the inter-ring angles to be used in actual transmission and reception of the high-frequency power, based on power values of the high-frequency power transmitted from one of the resonator and the other resonator to the other one of the resonator and the other resonator so as to satisfy a condition that a kQe product is equal to 1, where k denotes a coupling coefficient and Qe denotes an external Q value of the resonator, the power values each being detected at one of the plurality of positions of the resonator,
wherein the resonator has, at a center position in a longitudinal direction of the resonator, a protruding portion protruding from a side surface of the resonator toward the central axis of the resonator, the resonator and the protruding portion being integrally formed of a metal plate, and wherein the resonator is supported at the position of the central axis thereof by a support rod disposed through the protruding portion and extending in an up-down direction and the resonator is configured to rotate around the central axis of the resonator in a state where the port angle of the input/output line connected to the resonator is kept constant.

2. The resonance apparatus according to claim 1, wherein the control section sets the first inter-ring angle from the inter-ring angles such that a transmission efficiency of the high-frequency power between the resonator and the other resonator is higher than or equal to a threshold or is maximized.

3. The resonance apparatus according to claim 1, wherein
the control section causes transmission and reception of the high-frequency power to be performed between the resonator and the other resonator with a first power value before setting the angle, and
the control section causes transmission and reception of the high-frequency power to be performed between the resonator and the other resonator with a second power value after setting the angle, the second power value being larger than the first power value.

4. The resonance apparatus according to claim 1, wherein the resonator has a structure in which metallic films and insulating films are alternately stacked.

5. A noncontact power transmission apparatus, comprising:
a first resonance apparatus; and
a second resonance apparatus,
the power transmission apparatus performing transmission and reception of high-frequency power in a noncontact manner by using resonators respectively included in the first resonance apparatus and the second resonance apparatus, the resonators each having a structure in which a part of a closed-curve line is opened, wherein
one of the first resonance apparatus and the second resonance apparatus includes:
a driving section that rotates a corresponding one of the resonators in a circumferential direction of the corresponding resonator within a plane formed by the closed-curve line; and
a control section that controls the driving section to cause transmission and reception of the high-frequency power to be experimentally performed between the corresponding resonator and the other resonator at a plurality of positions defined by different inter-ring angles, the inter-ring angles being angles between an opening portion of the corresponding resonator and an opening portion of the other resonator in the circumferential direction of the corresponding resonator, by rotating the corresponding resonator around the central axis of the corresponding resonator in a state where the corresponding resonator and the other resonator are parallel to each other, and that sets a first inter-ring angle from the inter-ring angles to be used in actual transmission and reception of the high-frequency power, based on power values of the high-frequency power transmitted from the corresponding resonator to the other resonator so as to satisfy a condition that a kQe product is equal to 1, where k denotes a coupling coefficient and Qe denotes an external Q value of the corresponding resonator, the power values each being detected at one of the plurality of positions of the corresponding resonator, wherein the corresponding resonator has at a center position in a longitudinal direction of the corresponding resonator, a protruding portion protruding from a side surface of the corresponding resonator toward a central axis of the corresponding resonator, the corresponding resonator and the protruding portion being integrally formed of a metal plate, and wherein the corresponding resonator is supported, at the position of the central axis thereof, by a support rod disposed through the protruding portion and extending in an up-down direction, and the corresponding resonator is configured to rotate around the central axis of the corresponding resonator in a state where the port angle of the input/output line connected to the corresponding resonator is kept constant.

6. A power transmission method for performing transmission and reception of high-frequency power in a noncontact manner by using resonators respectively included in a first resonance apparatus and a second resonance apparatus, the resonators each having a structure in which a part of a closed-curve line is opened, the power transmission method comprising:
in one of the first resonance apparatus and the second resonance apparatus,
rotating a corresponding one of the resonators in a circumferential direction of the corresponding resonator around the central axis of the corresponding resonator within a plane formed by the closed-curve line in a state where the corresponding resonator and the other resonator are parallel to each other; and
causing transmission and reception of the high-frequency power to be experimentally performed between the corresponding resonator and the other resonator at a plurality of positions defined by different inter-ring angles, the inter-ring angles being angles between an opening portion of the corresponding resonator and an opening portion of the other resonator in the circumferential direction of the corresponding resonator,
and setting a first inter-ring angle from the inter-ring angles to be used in actual transmission and reception of the high-frequency power, based on power values of the high-frequency power transmitted from the corresponding resonator to the other resonator so as to satisfy a condition that a kQe product is equal to 1, w h ere k denotes a coupling coefficient and Qe denotes an external Q value of the corresponding resonator, the power values each being detected at one of the plurality of positions of the corresponding resonator, wherein the corresponding resonator has, at a center position in a longitudinal direction of the corresponding resonator, a protruding portion protruding from a side surface of the corresponding resonator toward the central axis of the corresponding resonator, the corresponding resonator and the protruding portion being integrally formed of a meta) plate, and wherein the corresponding resonator is supported, at the position of the central axis thereof, by a support rod disposed through the protruding portion and extending in an up-down direction, and the corresponding resonator is configured to rotate around the central axis of the corresponding resonator in a state where the port angle of the input/output line connected to the corresponding resonator is kept constant.

* * * * *